(12) United States Patent
Takami et al.

(10) Patent No.: US 11,888,160 B2
(45) Date of Patent: Jan. 30, 2024

(54) ELECTRODE, SECONDARY BATTERY, BATTERY PACK, AND VEHICLE

(71) Applicant: KABUSHIKI KAISHA TOSHIBA, Minato-ku (JP)

(72) Inventors: Norio Takami, Yokohama (JP); Kazuomi Yoshima, Yokohama (JP); Takuya Iwasaki, Uenohara (JP); Tomoko Sugizaki, Kawasaki (JP); Yasuhiro Harada, Isehara (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 176 days.

(21) Appl. No.: 16/289,123

(22) Filed: Feb. 28, 2019

(65) Prior Publication Data

US 2019/0198876 A1    Jun. 27, 2019

Related U.S. Application Data

(63) Continuation of application No. PCT/JP2018/030836, filed on Aug. 21, 2018.

(30) Foreign Application Priority Data

Sep. 19, 2017 (JP) ................. 2017-178782

(51) Int. Cl.
*H01M 4/36* (2006.01)
*H01M 4/62* (2006.01)
(Continued)

(52) U.S. Cl.
CPC ............... *H01M 4/62* (2013.01); *B60L 50/64* (2019.02); *C01G 23/003* (2013.01); *H01M 4/13* (2013.01); *H01M 4/131* (2013.01); *H01M 4/366* (2013.01); *H01M 4/485* (2013.01); *H01M 4/622* (2013.01); *H01M 10/0525* (2013.01); *H01M 10/425* (2013.01); *H01M 10/44* (2013.01); *H01M 50/4295* (2021.01); *H01M 50/44* (2021.01);
(Continued)

(58) Field of Classification Search
None
See application file for complete search history.

(56) References Cited

U.S. PATENT DOCUMENTS

| | | | |
|---|---|---|---|
| 8,192,859 B2 | 6/2012 | Takami. et al. | |
| 9,318,742 B2 | 4/2016 | Fujino et al. | |

(Continued)

FOREIGN PATENT DOCUMENTS

| | | |
|---|---|---|
| CN | 101849308 B | 8/2013 |
| CN | 105431971 A | 3/2016 |

(Continued)

OTHER PUBLICATIONS

English translation of the International Search Report dated Oct. 23, 2018 in PCT/JP2018/030836.
(Continued)

*Primary Examiner* — Haixia Zhang
(74) *Attorney, Agent, or Firm* — Oblon, McClelland, Maier & Neustadt, L.L.P.

(57) ABSTRACT

According to one embodiment, there is provided an electrode including active material particles, polymer fibers and inorganic solid particles. The polymer fibers have an average fiber diameter of 1 nm to 100 nm.

15 Claims, 8 Drawing Sheets

(51) Int. Cl.
*H01M 10/0525* (2010.01)
*C01G 23/00* (2006.01)
*H01M 4/485* (2010.01)
*H01M 10/42* (2006.01)
*H01M 10/44* (2006.01)
*H01M 4/131* (2010.01)
*H01M 4/13* (2010.01)
*H01M 50/44* (2021.01)
*H01M 50/429* (2021.01)
*B60L 50/64* (2019.01)
*H01M 4/02* (2006.01)
*H01M 4/505* (2010.01)
*H01M 4/525* (2010.01)

(52) U.S. Cl.
CPC .......... *H01M 4/505* (2013.01); *H01M 4/525* (2013.01); *H01M 2004/027* (2013.01); *H01M 2004/028* (2013.01); *H01M 2010/4271* (2013.01); *H01M 2220/20* (2013.01)

(56) References Cited

U.S. PATENT DOCUMENTS

| | | | |
|---|---|---|---|
| 9,553,343 B2 | 1/2017 | Malcolm et al. | |
| 2009/0026662 A1 | 1/2009 | Yun et al. | |
| 2009/0162750 A1 | 6/2009 | Kawakami. et al. | |
| 2011/0165471 A9 | 7/2011 | Skotheim et al. | |
| 2011/0292568 A1 | 12/2011 | Eguchi et al. | |
| 2012/0009475 A1* | 1/2012 | Nakura | H01M 4/5825 |
| | | | 429/220 |
| 2012/0052401 A1* | 3/2012 | Goodenough | H01M 10/052 |
| | | | 429/341 |
| 2012/0058395 A1 | 3/2012 | Harada et al. | |
| 2013/0183836 A1 | 7/2013 | Kim et al. | |
| 2013/0300191 A1 | 11/2013 | Takaoka | |
| 2014/0080006 A1* | 3/2014 | Ogasa | H01M 10/0525 |
| | | | 429/322 |
| 2014/0170465 A1 | 6/2014 | Visco et al. | |
| 2014/0193691 A1* | 7/2014 | Ueki | H01M 50/431 |
| | | | 429/144 |
| 2014/0248537 A1 | 9/2014 | Hayashi et al. | |
| 2014/0295285 A1 | 10/2014 | Lee et al. | |
| 2014/0302399 A1 | 10/2014 | Saimen et al. | |
| 2015/0037634 A1* | 2/2015 | Malcolm | H01M 50/502 |
| | | | 429/90 |
| 2015/0228966 A1 | 8/2015 | Kintaka | |
| 2015/0249243 A1 | 9/2015 | Nagino et al. | |
| 2015/0325851 A1 | 11/2015 | Hardiyanto et al. | |
| 2016/0099461 A1 | 4/2016 | Kishimoto | |
| 2016/0190589 A1 | 6/2016 | Oono et al. | |
| 2017/0092930 A1 | 3/2017 | Chae et al. | |
| 2017/0200943 A1 | 7/2017 | Kawakami | |
| 2018/0083307 A1 | 3/2018 | Makino et al. | |
| 2018/0090782 A1 | 3/2018 | Choi et al. | |
| 2019/0123386 A1 | 4/2019 | Takahashi et al. | |

FOREIGN PATENT DOCUMENTS

| | | |
|---|---|---|
| JP | 2010-153375 | 7/2010 |
| JP | 5110565 B2 | 12/2012 |
| JP | 2015-232996 | 12/2015 |
| JP | 5988342 B2 | 9/2016 |
| JP | 6020892 B2 | 11/2016 |
| JP | 2017-130451 | 7/2017 |
| KR | 10-2016-0043939 | 4/2016 |
| WO | WO 2011/013254 A1 | 2/2011 |
| WO | WO 2013/042720 A1 | 3/2013 |
| WO | WO 2014/049949 A1 | 4/2014 |
| WO | WO2016/010056 A1 | 1/2016 |
| WO | WO 2016/199805 A1 | 12/2016 |

OTHER PUBLICATIONS

International Search Report dated Oct. 23, 2018 in PCT/JP2018/030836 filed Aug. 21, 2018 (with English Translation of Categories of Cited Documents).
Written Opinion dated Oct. 23, 2018 in PCT/JP2018/030836 filed Aug. 21, 2018.

* cited by examiner

ELECTRODE, SECONDARY BATTERY, BATTERY PACK, AND VEHICLE

CROSS-REFERENCE TO RELATED APPLICATIONS

This application is a Continuation Application of PCT Application No. PCT/JP2018/030836, filed Aug. 21, 2018 and based upon and claiming the benefit of priority from Japanese Patent Application No. 2017-178782, filed Sep. 19, 2017, the entire contents of all of which are incorporated herein by reference.

FIELD

Embodiments described herein relate generally to a positive electrode, electrode, a secondary battery, a battery pack and a vehicle.

BACKGROUND

A nonaqueous electrolyte battery containing metallic lithium, a lithium alloy, a lithium compound, or a carbonaceous material in a negative electrode is expected as a high-energy density battery. Thus, this battery has been extensively researched and developed. Lithium ion batteries each including a positive electrode containing $LiCoO_2$, $LiNi_{1/3}Co_{1/3}Mn_{1/3}O_2$, or $LiMn_2O_4$ as an active material and a negative electrode containing a carbonaceous material that allows lithium ions to be inserted and extracted have widely been put into practice. A metal oxide or alloy has been studied as an alternative to the carbonaceous material in the negative electrode.

EMBODIMENT

Especially, when mounting the battery in a vehicle such as an automobile, a material with excellent chemical and electrochemical stability, strength, and corrosion resistance is needed as the material of the negative electrode from the viewpoint of cycle performance under a high-temperature environment, high-output long-term reliability, and safety. If high performance is required even in a cold district, high-output performance and long-life performance under a low-temperature environment are needed. On the other hand, from the viewpoint of improving safety performance, solid electrolytes, nonvolatile electrolytic solutions, and incombustible electrolytic solutions have been developed as electrolytes. However, the solid electrolytes, nonvolatile electrolytic solutions, and incombustible electrolytic solutions have not yet been put into practical use because they lower discharge rate performance, low-temperature performance, and long-life performance.

In development of an all-solid-state secondary battery, research and development have been conducted to improve the ionic conductivity of an oxide solid electrolyte or sulfide solid electrolyte. However, the ion conduction resistance or reaction resistance in each electrode and the interface resistance of the electrode/solid electrolyte are high, thereby imposing a problem concerning discharge performance and low-temperature performance. In a charge-and-discharge cycle, disconnection of ion conduction paths in the electrodes caused by expansion/contraction of the electrodes increases the resistance and degrades the joining of the electrode/solid electrolyte. As a result, the interface resistance of the electrode/solid electrolyte increases, and the cycle life performance and discharge rate performance significantly lower. These problems make it difficult for the all-solid-state secondary battery using the solid electrolyte to be put into practice.

DETAILED DESCRIPTION

Figure 1:
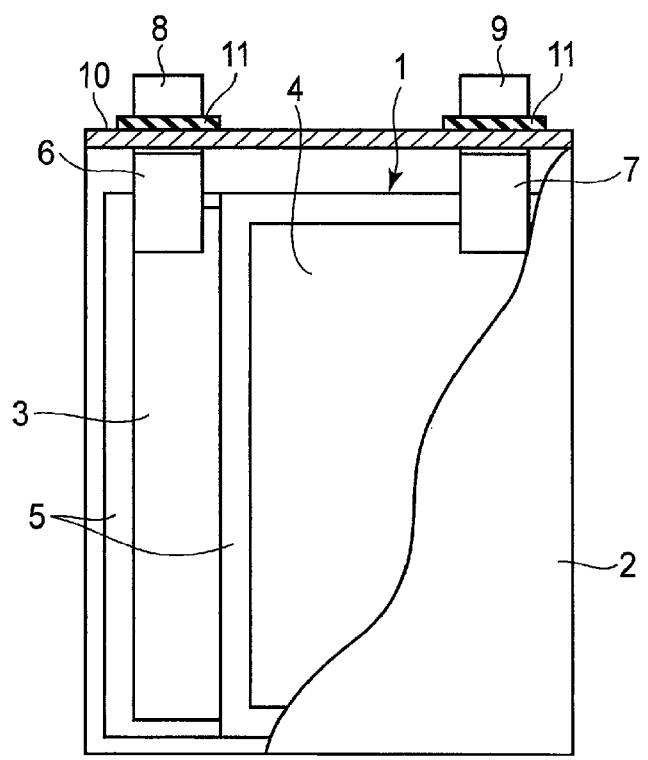
FIG. 1 is a partially cutaway sectional view showing a secondary battery according to an embodiment.

According to one embodiment, there is provided a positive electrode including a positive electrode active material-containing layer. The positive electrode active material-containing layer includes positive electrode active material particles, polymer fibers, and inorganic solid particles. The polymer fibers have an average fiber diameter of 1 nm to 100 nm.

Another embodiment provides an electrode including an electrode active material-containing layer. The electrode active material-containing layer includes electrode active material particles, polymer fibers, and inorganic solid particles. The polymer fibers have an average fiber diameter of 1 nm to 100 nm.

Another embodiment provides a secondary battery including the positive electrode or the electrode of the embodiment.

Another embodiment provides a battery pack including the secondary battery of the embodiment.

Another embodiment provides a vehicle including the battery pack of the embodiment.

First Embodiment

According to the first embodiment, there is provided a positive electrode containing positive electrode active material particles, polymer fibers, and inorganic solid particles. The average fiber diameter of the polymer fibers ranges from 1 nm to 100 nm.

The positive electrode active material particles are those that allow lithium ions to be inserted and extracted. For example, high-potential positive electrode active material particles such as lithium nickel cobalt manganese composite oxide particles or lithium phosphate oxide particles having an olivine structure significantly expand/contract at the time of inserted/extracted lithium ions. Consequently, a liquid electrolyte (electrolytic solution), a gel electrolyte, or the like held by the positive electrode may ooze from the positive electrode due to expansion/contraction of the positive electrode active material.

The polymer fibers having an average fiber diameter of 1 nm to 100 nm have a nano-size fiber diameter, and are thus readily dispersed in the positive electrode to form fine through holes arranged in a mesh shape. As a result, an electrolyte such as a liquid electrolyte or gel electrolyte is carried or held by the polymer fibers. Thus, it is possible to suppress disconnection of ion conduction caused by expansion/contraction of the positive electrode active material, and decrease the ion conduction resistance in the positive electrode. Therefore, a secondary battery including this positive electrode can improve the charge-and-discharge cycle life, discharge rate performance, and low-temperature performance.

If the polymer fibers include cellulose fibers, the aspect ratio of the polymer fibers can be set to, for example, a large value ranging from 100 to 10,000, thereby encouraging formation of fine through holes arranged in a mesh shape by the polymer fibers. As a result, extraction of the electrolyte from the positive electrode is further suppressed, and it is thus possible to further decrease the ion conduction resistance in the positive electrode. Therefore, the secondary battery including the positive electrode can further improve the charge-and-discharge cycle life, discharge rate performance, and low-temperature performance.

If the inorganic solid particles contain at least one material selected from the group consisting of $Al_2O_3$, $TiO_2$, $ZrO_2$, and a phosphate compound, they can conduct lithium ions without solvation. This makes it possible to encourage ion conduction in the positive electrode.

The phosphate compound desirably contains a material having a NASICON structure and expressed as $Li_{1+y}Al_xM_{2-x}(PO_4)_3$ (M represents at least one element selected from the group consisting of Ti, Ge, Sr, Sn, Zr, and Ca for $0 \leq x \leq 1$ and $0 \leq y \leq 1$). It is considered that on an interface among the positive electrode active material particles, the inorganic solid particles, and the liquid or gel electrolyte held in the fine through holes formed between the polymer fibers, lithium ion concentration which is not influenced by solvation increases, and high-speed lithium ion conduction occurs, thereby decreasing the ion conduction resistance and the resistance of the positive electrode active material particle interface in the positive electrode.

When the content of the polymer fibers ranges from 0.2 wt % to 5 wt %, and the content of the inorganic solid particles ranges from 0.5 wt % to 10 wt %, it is possible to decrease the lithium ion conduction resistance and the electron conduction resistance in the positive electrode while keeping the electrode density high.

Furthermore, a secondary battery including a positive electrode, a negative electrode containing a titanium-containing oxide, and an electrolyte can obtain excellent charge-and-discharge cycle life, discharge rate performance, and low-temperature performance.

By including, in the titanium-containing oxide, at least one material selected from the group consisting of a lithium titanium oxide having a spinel structure, a monoclinic titanium oxide, and a niobium titanium oxide, it is possible to increase the safety of the secondary battery.

The positive electrode will be described in more detail below.

The positive electrode includes a positive electrode current collector, and a positive electrode active material-containing layer that is carried by at least one principal surface, that is, one or both surfaces of the current collector.

The positive electrode active material-containing layer contains positive electrode active material particles that allow lithium ions to be inserted/extracted, polymer fibers having an average fiber diameter of 1 nm to 100 nm, and inorganic solid particles. The positive electrode active material-containing layer may also contain a conductive agent and a binder.

An aluminum foil or aluminum alloy foil can be used as the positive electrode current collector. The purity of the aluminum foil or aluminum alloy foil can be set to 99% or higher. The upper limit of the purity is 100% which is pure aluminum. A more preferable aluminum purity ranges from 99% to 99.99%. In this range, it is possible to reduce deterioration in high-temperature cycle life caused by dissolution of an impurity element.

An aluminum alloy is preferably an alloy containing, in addition to aluminum, one or more elements selected from the group consisting of iron, magnesium, zinc, manganese, and silicon. For example, an Al—Fe based alloy, Al—Mn based alloy, and Al—Mg based alloy can obtain a strength higher than that of aluminum. On the other hand, the contents of a transition metal such as nickel or chromium in an aluminum alloy and aluminum are preferably 100 wt ppm or less (including 0 wt ppm). For example, an Al—Cu alloy improves the strength but degrades the corrosion resistance.

Examples of the positive electrode active material include a lithium manganese composite oxide, a lithium cobalt composite oxide, a lithium nickel composite oxide, a lithium nickel cobalt composite oxide, a lithium cobalt aluminum composite oxide, a lithium nickel aluminum composite oxide, a lithium manganese nickel composite oxide having a spinel structure, a lithium manganese cobalt composite oxide, a lithium-containing phosphate compound having an olivine structure, a fluorinated iron sulfate, and a lithium nickel cobalt manganese composite oxide. One type or two or more types of positive electrode active materials can be used.

As the lithium manganese composite oxide, for example, $Li_xMn_2O_4$ ($0 < x \leq 1$), $Li_xMnO_2$ ($0 < x \leq 1$), or the like can be used.

As the lithium cobalt composite oxide, for example, $Li_xCoO_2$ ($0 < x \leq 1$) or the like can be used.

As the lithium nickel aluminum composite oxide, for example, $Li_xNi_{1-y}Al_yO_2$ ($0 < x \leq 1$, $0 < y \leq 1$) or the like can be used.

As the lithium nickel cobalt composite oxide, for example, $Li_xNi_{1-y-z}Co_yMn_zO_2$ ($0 < x \leq 1$, $0 < y \leq 1$, $0 \leq z \leq 1$, $0 < 1-y-z < 1$) or the like can be used.

As the lithium manganese cobalt composite oxide, for example, $Li_xMn_yCo_{1-y}O_2$ ($0 < x \leq 1$, $0 < y < 1$) or the like can be used.

As the lithium manganese nickel composite oxide having the spinel structure, for example, $Li_xMn_{2-y}Ni_yO_4$ ($0 < x \leq 1$, $0 < y < 2$) or the like can be used.

As the lithium-containing phosphate compound having the olivine structure, for example, $Li_xFePO_4$ ($0 < x \leq 1$), $Li_xFe_{1-y}Mn_yPO_4$ ($0 < x \leq 1$, $0 \leq y \leq 1$), $Li_xCoPO_4$ ($0 < x \leq 1$), $Li_xMnPO_4$ ($0 < x \leq 1$), or the like can be used.

As the fluorinated iron sulfate, for example, $Li_xFeSO_4F$ ($0 < x \leq 1$) or the like can be used.

As the lithium nickel cobalt manganese composite oxide, for example, $Li_xNi_{1-y-z}CO_yMn_zO_2$ ($0 < x \leq 1.1$, $0 < y \leq 0.5$, $0 < z \leq 0.5$, $0 < 1-y-z < 1$) or the like can be used.

With the above positive electrode active materials, it is possible to obtain a high positive electrode voltage. Among them, the lithium nickel aluminum composite oxide, lithium nickel cobalt manganese composite oxide, and lithium manganese cobalt composite oxide can suppress a reaction with an electrolyte under a high-temperature environment and greatly improve the battery life. The lithium nickel cobalt manganese composite oxide expressed as $Li_xNi_{1-y-z}Co_yMn_zO_2$ can obtain a long life under high temperature.

The positive electrode active material particles may be primary particles, secondary particles as the aggregates of primary particles, or a mixture of primary particles and secondary particles.

The average primary particle size of the positive electrode active material particles can range from 0.05 μm to 3 μm.

The average secondary particle size of the positive electrode active material particles can range from 3 μm to 20 μm.

The conductive agent can improve the electron conductivity and suppress the contact resistance to a current collector. As the conductive agent, for example, acetylene black, carbon black, or graphite can be used.

The binder can bind the active material and the conductive agent. Examples of the binder include a polymer such as polytetrafluoroethylene (PTFE), polyvinylidene fluoride (PVdF), fluorine based rubber, styrene butadiene rubber, and carboxymethyl cellulose (CMC). The binder can impart the flexibility to an active material containing layer including polymer fibers. PVdF and styrene butadiene rubber are excellent in improving the flexibility.

The reason why the average fiber diameter of the polymer fibers is specified will be described. If the average fiber diameter exceeds 100 nm, it is difficult to distribute the polymer fibers to fine portions in the positive electrode. In addition, since the specific surface area of the polymer fibers is short, the amount of the electrolyte held by the polymer fibers becomes small. Consequently, the low-temperature performance or discharge rate performance of the battery lowers. The average fiber diameter is desirably small. However, if the average fiber diameter is smaller than 1 nm, dispersion of the fibers in the electrode is insufficient, and the fibers thus cannot uniformly hold the electrolyte. The average fiber diameter more preferably ranges from 5 nm to 50 nm.

The content of the polymer fibers in the positive electrode active material-containing layer desirably ranges from 0.2 wt % to 5 wt %. If the content of the polymer fibers exceeds 5 wt %, the contents of the remaining components relatively decrease, and thus the density of the positive electrode may lower. If the content of the polymer fibers is set to be smaller than 0.2 wt %, the effect of the polymer fibers having an average fiber diameter of 1 nm to 100 nm cannot be obtained, thereby degrading the charge-and-discharge cycle life, discharge rate performance, and low-temperature performance. The content more preferably ranges from 0.3 wt % to 2 wt %.

The polymer fibers are preferably cellulose fibers (cellulose nanofibers). The cellulose fibers have an average fiber diameter of 1 nm to 100 nm, that is, a nano-size fiber diameter, and a very high aspect ratio (100 to 10,000), and can thus firmly hold a liquid electrolyte in the fine through holes in the positive electrode.

The inorganic solid particles desirably contain at least one material selected from the group consisting of $Al_2O_3$, $TiO_2$, $ZrO_2$, and a phosphate compound. As the phosphate compound, for example, $AlPO_4$, $Li_3PO_4$, a material having a NASICON structure and expressed as $Li_{1+y}Al_xM_{2-x}(PO_4)_3$ (M represents at least one element selected from the group consisting of Ti, Ge, Sr, Sn, Zr, and Ca for $0 \leq x \leq 1$ and $0 \leq y \leq 1$) can be used. The phosphate compound having the NASICON structure and expressed as $Li_{1+y}Al_xM_{2-x}(PO_4)_3$ has excellent stability in the atmosphere, and high lithium ion conductivity.

The average particle size of the inorganic solid particles can be set to 1 μm or less. The average particle size more preferably ranges from 0.01 μm to 1 μm, and much more preferably 0.05 μm to 0.6 μm. In this range, the lithium ion conductivity in the positive electrode is improved, thereby decreasing the resistance in the positive electrode. By compositing the polymer fibers and the inorganic solid particles, high-speed ionic conductivity can be maintained even in the positive electrode that significantly expands/contracts. It is considered that especially on an interface among the high-potential positive electrode active material particles, the inorganic solid particles having an average particle size of 1 μm or less, and the liquid or gel electrolyte held in the fine through holes arranged between the polymer fibers, the lithium ion concentration which is not influenced by solvation increases, and high-speed lithium ion conduction occurs, thereby decreasing the ion conduction resistance and the resistance of the positive electrode active material interface in the positive electrode.

The content of the inorganic solid particles in the positive electrode active material-containing layer preferably ranges from 0.5 wt % to 10 wt %. If the content of the inorganic solid particles exceeds 10 wt %, the contents of the remaining components relatively decrease, and thus the density of the positive electrode may lower. If the content of the inorganic solid particles is set to be smaller than 0.5 wt %, the effect of the inorganic solid particles cannot be obtained, thereby degrading the charge-and-discharge cycle life, discharge rate performance, and low-temperature performance. The content more preferably ranges from 1 wt % to 6 wt %.

The positive electrode can include an electrolyte. Further, as the polymer capable of making a gel of the electrolyte in the positive electrode, for example, a polymer that produces a gel electrolyte with a presence of carbonate, or the like can be used. Examples of the polymer include polyacrylonitrile (PAN), polyethylene oxide (PEO), polyvinylidene fluoride (PVdF), and polymethyl metacrylate. The gel polymer electrolyte using polyacrylonitrile is preferable since it has high ionic conductivity to improve the discharge performance and low temperature performance. The ratio of the gel polymer electrolyte to the positive electrode active material containing layer preferably ranges from 1 wt % to 10 wt %. If the ratio falls outside the range, the low temperature performance or discharge performance may lower.

One type or two or more types of components such as the positive electrode active material, conductive agent, binder, polymer fibers, inorganic solid particles, and polymer can be contained in the above-described positive electrode.

As the mixing ratio of the positive electrode active material, the conductive agent, and the binder, the content of the positive electrode active material preferably ranges from 80 wt % to 95 wt %, the content of the conductive agent preferably ranges from 3 wt % to 18 wt %, and the content of the binder preferably ranges from 2 wt % to 7 wt %. The conductive agent can exhibit the above-described effect at 3 wt % or more, and can reduce decomposition of the non-aqueous electrolyte on the conductive agent surface stored under a high temperature at 18 wt % or less. The binder can obtain a sufficient electrode strength at 2 wt % or more, and can reduce the insulating portion of the electrode at 7 wt % or less.

As the mixing ratio of the positive electrode active material, the conductive agent, the binder, the polymer fibers, and the inorganic solid particles, the content of the positive electrode active material preferably ranges from 80 wt % to 95 wt %, the content of the conductive agent preferably ranges from 1 wt % to 8 wt %, the content of the binder preferably ranges from 0.5 wt % to 3 wt %, the content of the polymer fibers preferably ranges from 0.2 wt % to 5 wt %, and the content of the inorganic solid particles preferably ranges from 0.5 wt % to 10 wt %.

The positive electrode is produced by, for example, suspending the positive electrode active material, the conductive agent, and the binder in an appropriate solvent, applying the suspended substance to the positive electrode current collector, drying the suspended substance, and performing press. The positive electrode press pressure preferably ranges from 0.15 ton/mm to 0.3 ton/mm. This range is preferable because the adhesion or peel strength between the positive electrode active material containing layer and the positive electrode current collector such as an aluminum foil increases, and the elongation percentage of a positive electrode current collector foil becomes 20% or less.

The positive electrode is produced by, for example, dispersing particles of the positive electrode active material, the polymer fibers, the inorganic solid particle, the conductive agent, and the binder in a solvent, applying the obtained slurry to the current collector, drying the slurry, and performing press (for example, heating press). Alternatively, particles of the positive electrode active material, the conductive agent, and the binder are dispersed in a solvent to obtain a first slurry. Further, the polymer fibers and the inorganic solid particles are dispersed in a solvent to obtain a second slurry. The first slurry is applied to a current collector, and then the second slurry is applied to a layer of the first slurry on the current collector. Subsequently, these slurries are dried, and a positive electrode is obtained by performing press (for example, heating press). The application of the slurry to the current collector is performed by, for example, spraying, a device of die coater, or the like.

A method of measuring the content of the polymer fibers in the positive electrode active material-containing layer will be described below. The positive electrode active material-containing layer peeled from the positive electrode current collector is ground using a mortar or the like, and the thus obtained ground product is dispersed in water to separate the polymer fibers using a specific gravity difference. The polymer fibers in a supernatant are dried at 100° C. for 12 hours, and the weight of the polymer fibers is measured, thereby obtaining the content of the polymer fibers in the positive electrode active material-containing layer.

The polymer fibers whose weight has been measured by the above-described method are observed by an SEM (Scanning Electron Microscope) at a magnification of 10,000, and widths are measured at positions of 25%, 50%, and 75% of the full length of the polymer fibers within the field of view. The average of the values of the measured widths is obtained as an average fiber diameter. Measurement is performed for all the polymer fibers existing within the field of view.

A method of measuring the content of the inorganic solid particles in the positive electrode active material-containing layer will be described below. The positive electrode active material-containing layer having undergone an electrolyte removal treatment by a method (to be described later) is ground using a mortar or the like, and the thus obtained ground product is dispersed in water to separate the polymer fibers and the conductive agent using a specific gravity difference. The polymer fibers and conductive agent in a supernatant are removed. The precipitate is washed by dimethyl carbonate to remove the binder. Subsequently, the obtained material is dried, and particle size distribution data is obtained for the thus obtained powder by laser diffraction (to be described later). Based on the obtained particle size distribution data, the content of the inorganic solid particles in the positive electrode active material-containing layer is calculated.

The average primary particle sizes of the positive electrode active material particles and the inorganic solid particles are measured by the following method. That is, a laser diffraction particle-size analyzer (SALD-300 of Shimadzu corporation or an apparatus having the equivalent function) is used to perform measurement by a method of adding about 0.1 g of a sample, a surfactant, and 1 to 2 mL of distilled water to a beaker, sufficiently stirring them, injecting the mixture into a water stirring tank, measuring a luminous intensity distribution 64 times at an interval of 2 sec, and analyzing particle size distribution data.

With respect to the positive electrode included in the secondary battery, if the average fiber diameter of the polymer fibers and the like are confirmed, the positive electrode is extracted from the secondary battery by the following method. That is, the secondary battery is disassembled in a glove box filled with argon to extract the positive electrode. The positive electrode active material-containing layer is separated from the positive electrode current collector of the extracted positive electrode. The positive electrode active material-containing layer is washed by dimethyl carbonate to remove the electrolyte, and dried. After that, the average fiber diameter of the polymer fibers and the like are confirmed.

The positive electrode according to the above-described first embodiment includes the positive electrode active material particles that allow lithium ions to be inserted/extracted, the polymer fibers having an average fiber diameter of 1 nm to 100 nm, and the inorganic solid particles. This can decrease the ion conduction resistance in the positive electrode. Therefore, the secondary battery including this positive electrode can improve the charge-and-discharge cycle life, discharge rate performance, and low-temperature performance.

Second Embodiment

A secondary battery according to the second embodiment includes a positive electrode, a negative electrode, and an electrolyte. As the positive electrode, the positive electrode according to the first embodiment can be used. The secondary battery may include a container member that stores the positive electrode, the negative electrode, and the electrolyte. In the secondary battery, an electrolyte-containing layer may be arranged between the positive and negative electrodes.

The electrolyte, the negative electrode, the electrolyte-containing layer, and the container member will be described below.

1) Electrolyte

Examples of the electrolyte are a liquid electrolyte, a gel electrolyte, a solid electrolyte, and a composite electrolyte.

The liquid electrolyte contains an electrolyte salt such as a lithium salt and an organic solvent in which the electrolyte salt is dissolved. The gel electrolyte contains an electrolyte salt such as a lithium salt, an organic solvent in which the electrolyte salt is dissolved, and a polymer as a gel agent. The solid electrolyte contains an oxide or sulfide having lithium ion conductivity. The composite electrolyte contains inorganic solid particles (to be referred to as second inorganic solid particles hereinafter), and a polymer containing lithium ions and an organic solvent, and is a composite of the second inorganic solid particles and gel electrolyte. The composite electrolyte is preferable because it has high ionic conductivity.

The polymer is not particularly limited as long as it can produce a gel containing the lithium ion-containing organic solvent, and either a chemical gel agent or a physical gel agent can be used. For example, a polymer that can make a gel electrolyte with a presence of carbonate such as polyacrylonitrile (PAN), polyethylene oxide (PEO), polyvinylidene fluoride (PVdF), or polymethyl metacrylate can be used. When a polymer electrolyte is generated by compositing the carbonate and the polymer and followed by producing a gel, the ionic conductivity of the composite electrolyte is improved. The gel polymer electrolyte containing polyacrylonitrile has high ionic conductivity, and is preferable to improve the discharge performance and low-temperature performance. The ratio of the polymer to the composite electrolyte preferably ranges from 1 wt % to 10 wt %. If the ratio falls outside the range, the low-temperature performance or discharge performance may lower. One type or two or more types of polymers can be used.

The composite electrolyte may contain a binder to improve the mechanical strength. Examples of the binder are polyvinylidene fluoride (PVdF) and an acrylic binder. The binder may be added within the range of 0 to 5 wt %. If this range is exceeded, the ionic conductivity of the electrolyte may lower, thereby degrading the discharge performance.

The composite electrolyte may contain the same kind of polymer fibers as the polymer fibers contained in the positive electrode according to the first embodiment. The content of the polymer fibers in the composite electrolyte preferably ranges from 0.1 wt % to 10 wt %. In this range, the mechanical strength of the composite electrolyte layer increases, thereby making it possible to decrease the thickness to 10 µm. Thus, it is possible to largely reduce an internal short circuit and self-discharge while decreasing the internal resistance of the battery. Furthermore, the joining strength between the composite electrode and the positive and negative electrodes become large, and do not degrade in a charge-and-discharge cycle, and a rise in interface resistance is suppressed, thereby largely improving the cycle life performance.

The secondary inorganic solid particles may be inorganic particles having no lithium ion conductivity or low lithium ion conductivity, or an inorganic solid electrolyte having high lithium ion conductivity. One type or two or more types of second inorganic solid particles can be used.

As the inorganic particles having no lithium ion conductivity or low lithium ion conductivity, lithium aluminum oxide (for example, $LiAlO_2$ or $Li_xAl_2O_3$ for $0<x\leq 1$), lithium silicon oxide, or lithium zirconium oxide can be used.

An example of the inorganic solid electrolyte having lithium ion conductivity includes an oxide solid electrolyte having a garnet structure. The oxide solid electrolyte having the garnet structure has high lithium ion conductivity and reduction resistance, thereby providing the advantage of a wide electrochemical window. Examples of the oxide solid electrolyte having the garnet structure include $Li_{5+x}A_xLa_{3-x}M_2O_{12}$ (A represents at least one element selected from the group consisting of Ca, Sr, and Ba, M represents Nb and/or Ta, and x is preferably equal to 0.5 or less (including 0)), $Li_3M_{2-x}L_2O_{12}$ (M represents Nb and/or Ta, L includes Zr, and x is preferably equal to 0.5 or less (including 0)), $Li_{7-3x}Al_xLa_3Zr_3O_{12}$ (x is preferably equal to 0.5 or less (including 0)), and $Li_7La_3Zr_2O_{12}$. Among them, $Li_{6.25}Al_{0.25}La_3Zr_3O_{12}$, $Li_{6.4}La_3Zr_{1.4}Ta_{0.6}O_{12}$, $Li_{6.4}La_3Zr_{1.6}Ta_{0.6}O_{12}$, and $Li_7La_3Zr_2O_{12}$ have high ionic conductivity, and are electrochemically stable, and thus have excellent discharge performance and cycle life performance. Furthermore, fine particles having a specific surface area of 10 $m^2$/g to 500 $m^2$/g (preferably, 50 $m^2$/g to 500 $m^2$/g) have the advantage of being chemically stable with respect to an organic solvent.

An example of the inorganic solid electrolyte having lithium ion conductivity includes a lithium phosphate solid electrolyte having a NASICON structure. The lithium phosphate solid electrolyte having the NASICON structure has high stability to water, and is thus difficult to be eluted. An example of the lithium phosphate solid electrolyte having the NASICON structure includes $Li_{1+y}Al_xM_{2-x}(PO_4)_3$ where M represents at least one element selected from the group consisting of Ti, Ge, Sr, Sn, Zr, and Ca, and x and y satisfy $0\leq x\leq 1$ and $0\leq y\leq 1$, respectively. Preferable examples are $Li_{1+x}Al_xGe_{2-x}(PO_4)_3$, $Li_{1+x}Al_xZr_{2-x}(PO_4)_3$, and $Li_{1+x}Al_xTi_{2-x}(PO_4)_3$ where x preferably ranges from 0 to 1. Each of the exemplified solid electrolytes has high ionic conductivity and high electrochemical stability. Each solid electrolyte is electrochemically stable, and thus has excellent discharge performance and cycle life performance. Even if the solid electrolyte is further atomized to have a specific surface area of 10 $m^2$/g to 500 $m^2$/g, it has the advantage of being chemically stable with respect to an organic solvent. A preferable particle size (diameter) ranges from 0.01 µm to 1 µm. In this range, the ionic conductivity of the composite electrolyte is increased, thereby improving the discharge performance and low-temperature performance. The particle size more preferably ranges from 0.05 µm to 0.6 µm.

The ratio of the inorganic solid particles to the composite electrolyte can range from 85 wt % to 98 wt %. By setting the ratio to 85 wt % or more, it is possible to avoid an increase in self-discharge along with an internal short circuit caused by a decrease in strength of the electrolyte. By setting the ratio to 98 wt % or less, it is possible to avoid degradation in discharge performance or low temperature performance caused by a sudden reduction in ionic conductivity of the electrolyte.

Both the lithium phosphate solid electrolyte having the NASICON structure and the oxide solid electrolyte having the garnet structure may be used as inorganic solid electrolytes having lithium ion conductivity.

The lithium ion-containing organic electrolytic solution is prepared by dissolving, for example, a lithium salt in a solvent including an organic solvent.

Examples of the lithium salt are $LiPF_6$, $LiClO_4$, $LiBF_4$, $LiCF_3SO_3$, $LiN(FSO_2)_2$, and $LiN(CF_3SO_2)_2$. At least one type of lithium salt selected from the group consisting of $LiPF_6$, $LiBF_4$, and $LiN(FSO_2)_2$ is improved in discharge performance by increasing the ionic conductivity.

The organic solvent desirably includes carbonates. Examples of the carbonates are a cyclic carbonate such as ethylene carbonate (EC), propylene carbonate (PC) and butylene carbonate (BC), a chain carbonate such as diethyl carbonate (DEC), methyl ethyl carbonate (MEC) and dimethyl carbonate (DMC). The use of propylene carbonate (PC), diethyl carbonate (DEC), or methyl ethyl carbonate (MEC) improves the low-temperature performance.

The organic solvent can include solvents other than carbonates. Examples are γ-butyrolactone (GBL), α-methyl-γ-butyrolactone (MBL), phosphoric acid esters (for example, trimethyl phosphate ($PO(OCH_3)_3$), triethyl phosphate ($PO(OC_2H_5)_3$), tripropyl phosphate ($PO(OC_3H_7)_3$), and tributyl phosphate ($PO(OC_4H_9)_3$)) Especially, the use of γ-butyrolactone or trimethyl phosphate suppresses a rise in ion conduction resistance under a low-temperature environment, thereby making it possible to improve the discharge performance under the low-temperature environment (−30° C. or lower).

The composite electrolyte may be a gel electrolyte. By compositing a lithium ion-containing organic electrolytic solution with a polymer, a gel electrolyte can be obtained. The gel electrolyte can cover at least part of the inorganic solid particle surface.

The gel composite electrolyte is obtained by, for example, mixing, with the second inorganic solid particles and/or polymer fibers, an electrolyte composition containing the lithium ion-containing organic electrolytic solution and the polymer, as needed, and performing a heat treatment, as needed.

It is confirmed by the following method that the composite electrolyte is a gel. A gel can be confirmed by applying a pressure of 10 g/cm$^2$ to the composite electrolyte, and checking whether the electrolytic solution oozes or not.

One type or two or more types of components such as the lithium salt, organic solvent, polymer, polymer fibers, inorganic solid particles, and binder can be contained in the above-described electrolyte.

2) Negative Electrode

The negative electrolyte includes a negative electrode current collector and a negative electrode active material-containing layer carried by at least one principal surface, that is, one or both surfaces of the current collector. The negative electrode active material-containing layer contains an active material, and can also contain a conductive agent and a binder.

An aluminum foil or aluminum alloy foil can be used as the negative electrode current collector. The purity of the aluminum foil or aluminum alloy foil can be set to 98% or higher. The upper limit of the purity is 100% which is pure aluminum. A more preferable aluminum purity ranges from 98% to 99.95%. When a negative electrode active material containing titanium-containing oxide particles is used to reduce the negative electrode press pressure, it is possible to suppress elongation of the negative electrode current collector having the above-described purity. As a result, it is possible to improve the electron conductivity in the negative electrode current collector, and produce a low-resistance negative electrode by suppressing crush of the secondary particles of the titanium-containing oxide.

An aluminum alloy is preferably an alloy containing, in addition to aluminum, one or more elements selected from the group consisting of iron, magnesium, zinc, manganese, and silicon. For example, an Al—Fe based alloy, Al—Mn based alloy, and Al—Mg based alloy can obtain a strength higher than that of aluminum. On the other hand, the contents of a transition metal such as nickel or chromium in an aluminum alloy and aluminum are preferably 100 wt ppm or less (including 0 wt ppm). For example, an Al—Cu based alloy improves the strength but degrades the corrosion resistance.

The negative electrode active material is not particularly limited as long as it is possible to allow lithium ions to be inserted/extracted, and includes a carbon material, graphite material, lithium alloy, metal oxide, and metal sulfide. One type or two or more types of negative electrode active materials can be used. A negative electrode active material containing a titanium-containing oxide is preferable. When a titanium-containing oxide is used, an aluminum foil or aluminum alloy foil can be used as a negative electrode current collector in place of a copper foil, thereby reducing the weight and the cost. Additionally, this is advantageous in a bipolar electrode structure. The insertion/extraction potential of the lithium ions of the titanium-containing oxide preferably ranges from 1 V to 3 V (vs. Li/Li$^+$) relative to the Li potential. Examples of the titanium-containing oxide satisfying the above condition include a lithium titanium oxide, a titanium oxide, a niobium titanium oxide, and a sodium niobium titanium oxide. The titanium-containing oxide desirably includes at least one material selected from the group consisting of a lithium titanium oxide having a spinel structure, a monoclinic titanium oxide, and a niobium titanium oxide.

Examples of the lithium titanium oxide include a lithium titanium oxide having a spinel structure (for example, the general formula is $Li_{4+x}Ti_5O_{12}$ (−1≤x≤3)), a lithium titanium oxide having a ramsdellite structure (for example, $Li_{2+x}Ti_3O_7$ (−1≤x≤3)), $Li_{1+x}Ti_2O_4$ (0≤x≤1), $Li_{1.1+x}Ti_{1.8}O_4$ (0≤x≤1), and $Li_{1.07+x}Ti_{1.86}O_4$ (0≤x≤1).

Examples of the titanium oxide include a titanium oxide having a monoclinic crystal structure (for example, the structure before charge is $TiO_2(B)$, $Li_xTiO_2$ (0≤x)), a titanium oxide having a rutile structure (for example, the structure before charge is $TiO_2$, $Li_xTiO_2$ (0≤x)), and a titanium oxide having an anatase structure (for example, the structure before charge is $TiO_2$, $Li_xTiO_2$ (0≤x)).

Examples of the niobium titanium oxide include a material expressed as $Li_aTiM_bNb_{2\pm\beta}O_{7+\sigma}$ (0≤a≤5, 0≤b≤0.3, 0≤β≤0.3, 0≤σ≤0.3, M is at least one element selected from the group consisting of Fe, V, Mo, and Ta).

Examples of the sodium niobium titanium oxide include an orthorhombic Na-containing niobium titanium composite oxide represented by the general formula $Li_{2+v}Na_{2-w}M1_xTi_{6-y-z}Nb_yM2_zO_{14+\delta}$ (0≤v≤4, 0<w<2, 0≤x<2, 0<y≤6, 0≤z<3, −0.5≤δ≤0.5, 0<6-y-z<6, M1 includes at least one material selected from the group consisting of Cs, K, Sr, Ba, and Ca, and M2 includes at least one material selected from the group consisting of Zr, Sn, V, Ta, Mo, W, Fe, Co, Mn, and Al).

A preferable negative electrode active material is a lithium titanium oxide having a spinel structure. The lithium titanium oxide having the spinel structure has a small volume change at the time of charge/discharge. In addition, an aluminum foil or aluminum alloy foil can be used as a negative electrode current collector in place of a copper foil, thereby reducing the weight and the cost. This is advantageous in a bipolar electrode structure. The ratio of a negative electrode active material other than the titanium-containing oxide to the whole negative electrode active material is desirably 50 wt % or less.

The particles of the titanium-containing oxide can include single primary particles, secondary particles as the aggregates of primary particles, or a mixture of single primary particles and secondary particles.

The average particle size (diameter) of the secondary particles can be set to 2 μm or more, preferably, larger than 5 μm. The average particle size more preferably ranges from 7 μm to 20 μm. In this range, a negative electrode having a high density can be produced while keeping a negative electrode press pressure low, and it is possible to suppress elongation of the aluminum-containing current collector. The secondary particles of the titanium-containing oxide are obtained, as follows. That is, for example, the raw materials of the active material are reactively synthesized to produce an active material precursor having an average particle size of 1 μm or less. After that, a firing treatment is performed, and a grinding treatment is performed using a grinder such as a ball mill or a jet mill. Next, in a firing treatment, the active material precursor is aggregated to grow secondary particles with a larger particle size.

The average particle size (diameter) of the primary particles is desirably 1 μm or less. The effect is remarkable in high input performance (rapid charge). This is because, for example, the diffusion distance of lithium ions in the active material is shortened and the specific surface area is increased. A more preferable average particle size ranges from 0.1 μm to 0.8 μm. The negative electrode active material-containing layer may contain a mixture of the primary particles and secondary particles of the titanium-containing oxide. In terms of improving the density, the negative electrode active material-containing layer preferably contains 5 vol % to 50 vol % of primary particles.

At least part of the titanium-containing oxide particle surface is desirably covered with a carbon material layer. This can reduce the negative electrode resistance. A carbon material precursor is added in a secondary particle manufacturing process, and fired at 500° C. or higher in an inert atmosphere, thereby making it possible to cover at least part of the titanium-containing oxide particle surface with the carbon material layer.

The titanium-containing oxide particles have an average primary particle size of 1 μm or less, and the specific surface area in the BET method by $N_2$ adsorption preferably ranges from 3 $m^2/g$ to 200 $m^2/g$. This can further improve the affinity of the negative electrode for an electrolyte.

The specific surface area of the negative electrode preferably ranges from 3 $m^2/g$ to 50 $m^2/g$, more preferably, 5 $m^2/g$ to 50 $m^2/g$, and much more preferably, 1 $m^2/g$ to 20 $m^2/g$. In this range, reductive decomposition of an electrolyte under a high-temperature environment is suppressed, thereby improving the cycle life. The specific surface are of the negative electrode indicates the surface area of the negative electrode active material-containing layer per g (except the weight of the current collector). Note that the negative electrode active material-containing layer can be a porous layer containing a negative electrode active material, a conductive agent, and a binder.

The porosity of the negative electrode (except the current collector) desirably ranges from 20% to 50%. A negative electrode having a high affinity for an electrolyte and also having a high density can thus be obtained. The porosity more preferably ranges from 25% to 40%.

As the conductive agent, for example, a carbon material, metal compound powder, or metal powder can be used. Examples of the carbon material include acetylene black, carbon black, coke, carbon fibers, graphite, and carbon nanotube. The BET specific surface area of the carbon material by $N_2$ adsorption is preferably 10 $m^2/g$ or more. Examples of the metal compound powder include TiO, TiC, and TiN powders. Examples of the metal powder include Al, Ni, Cu, and Fe powders. Preferable examples of the conductive agent include coke having an average particle size of 10 μm or less and obtained by a heat treatment at a temperature of 800° C. to 2,000° C., graphite, acetylene black, carbon fibers having an average fiber diameter of 1 μm or less, and a TiO powder. One or more materials selected from them can reduce the electrode resistance and improve the cycle life performance. One type or two or more types of conductive agents can be used.

Examples of the binder include polytetrafluoroethylene (PTFE), polyvinylidene fluoride (PVdF), fluorine based rubber, acrylic rubber, styrene butadiene rubber, a core shell binder, polyimide, and carboxymethyl cellulose (CMC). One type or two or more types of binders can be used.

One type or two or more types of components such as the negative electrode active material, conductive agent, and binder can be contained in the above-described negative electrode.

As the mixing ratio of the negative electrode active material, the conductive agent, and the binder, the content of the negative electrode active material preferably ranges from 80 wt % to 95 wt %, the content of the conductive agent preferably ranges from 3 wt % to 18 wt %, and the content of the binder preferably ranges from 2 wt % to 7 wt %.

The negative electrode is produced by, for example, suspending particles of the negative electrode active material, the conductive agent, and the binder in an appropriate solvent, applying the suspended substance to the current collector, drying the suspended substance, and performing press (for example, heating press).

The average primary particle size of the negative electrode active material is measured by the following method. That is, a laser diffraction particle-size analyzer (SALD-300 of Shimadzu corporation or an apparatus having the equivalent function) is used to perform measurement by a method of adding about 0.1 g of a sample, a surfactant, and 1 to 2 mL of distilled water to a beaker, sufficiently stirring them, injecting the mixture into a water stirring tank, measuring a luminous intensity distribution 64 times at an interval of 2 sec, and analyzing particle size distribution data.

3) Electrolyte-Containing Layer

The electrolyte-containing layer may be arranged between the positive and negative electrodes. The electrolyte-containing layer electrically insulates the positive and negative electrodes from each other, and has ionic conductivity. Examples of the electrolyte-containing layer include a composite electrolyte layer and a separator holding a liquid or gel electrolyte. Both the composite electrolyte layer and the separator may be used for the electrolyte-containing layer.

If the liquid electrolyte and/or gel electrolyte is used, the separator may be arranged between the positive and negative electrodes. As the separator, for example, a synthetic resin nonwoven fabric, polyethylene porous film, polypropylene porous film, cellulose nonwoven fabric, or the like can be used.

4) Container Member

As the container member, a laminated film container or a metal container can be used. The container can have a shape conforming to the form of the secondary battery.

The thickness of the laminated film preferably falls within the range of 0.5 mm or less. A more preferable range is 0.2 mm or less. The lower limit value of the thickness of the laminated film is desirably set to 0.01 mm.

On the other hand, the plate thickness of the metal container preferably falls within the range of 0.5 mm or less. A more preferable range is 0.3 mm or less. The lower limit value of the plate thickness of the metal container is desirably set to 0.05 mm.

As the laminated film, for example, a multilayer film including a metal layer and a resin layer covering the metal layer can be used. To reduce the weight, the metal layer is preferably an aluminum foil or an aluminum alloy foil. The purity of the aluminum foil is preferably 99.5 wt % or more. The resin layer reinforces the metal layer, and can be formed from a polymer such as polypropylene (PP), polyethylene (PE), nylon, or polyethylene terephthalate (PET).

The laminated film container can be obtained by sealing laminated films using heat seal.

As the metal container, a metal can made of aluminum, an aluminum alloy, iron, or stainless steel and having a rectangular or cylindrical shape is usable. The metal container is desirably made of aluminum or an aluminum alloy. As the aluminum alloy, an alloy containing at least one element selected from the group consisting of manganese, magnesium, zinc, and silicon. The aluminum purity of the alloy is preferably 99.8 wt % or less. When the strength of the metal can made of an aluminum alloy significantly increases, it is possible to thin the thickness of the can. As a result, it is possible to implement a thin and lightweight battery having a high output and excellent heat dissipation.

The metal container can be sealed by a laser. Therefore, it is possible to reduce the volume of a sealing portion, as compared to the laminated film container, thereby improving the energy density.

The secondary battery according to the embodiment can be applied to secondary batteries in various forms such as a rectangular type, a cylindrical type, a flat type, a thin type, and a coin type. The secondary battery preferably has a bipolar structure. This is advantageous in producing, by one battery, a secondary battery having a voltage equal to that of a plurality of serial batteries. A bipolar battery including a composite electrolyte can prevent a short circuit caused by an electrolyte.

An example of the secondary battery according to the embodiment will be described with reference to FIGS. 1, 2, 3, 4, and 5.

Figure 2:
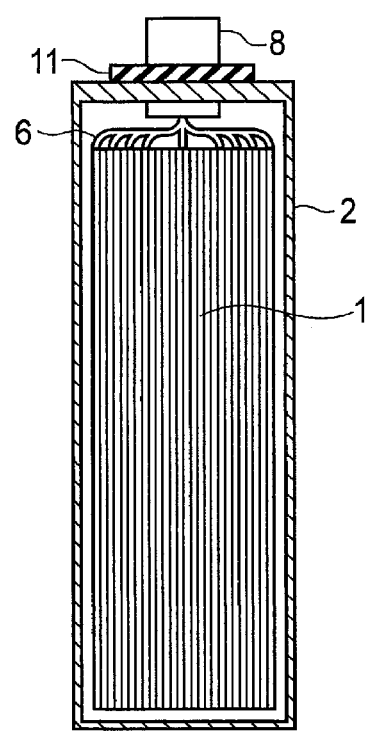
FIG. 2 is a side view of the battery shown in FIG. 1.

FIGS. 1 and 2 show an example of the secondary battery using a metal container.

An electrode group 1 is stored in a rectangular tubular metal container 2. The electrode group 1 has a structure formed by spirally winding the positive electrode active material-containing layer of a positive electrode 3 and the negative electrode active material-containing layer of a negative electrode 4 with an electrolyte-containing layer 5 interposing therebetween so as to form a flat shape. The electrolyte-containing layer 5 covers the surface of the positive electrode active material-containing layer or the negative electrode active material-containing layer. As shown in FIG. 2, a strip-shaped positive electrode lead 6 is electrically connected to each of a plurality of portions at an end of the positive electrode 3 located on an end face of the electrode group 1. A strip-shaped negative electrode lead 7 is electrically connected to each of a plurality of portions at an end of the negative electrode 4 located on the end face. The plurality of positive electrode leads 6 are bundled, and in this state, electrically connected to a positive electrode tab 8. A positive electrode terminal is formed from the positive electrode leads 6 and the positive electrode tab 8. In addition, the negative electrode leads 7 are bundled, and in this state, connected to a negative electrode tab 9. A negative electrode terminal is formed from the negative electrode leads 7 and the negative electrode tab 9. A sealing plate 10 made of a metal is fixed to the opening portion of the metal container 2 by welding or the like. The positive electrode tab 8 and the negative electrode tab 9 are extracted to the outside from outlet holes formed in the sealing plate 10, respectively. The inner surface of each outlet hole of the sealing plate 10 is covered with an insulating member 11 to avoid a short circuit caused by contact between the positive electrode tab 8 and the negative electrode tab 9.

Figure 3:
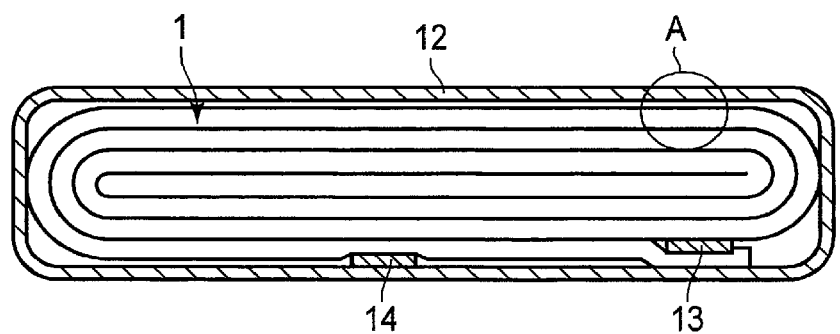
FIG. 3 is a sectional view showing the secondary battery taken along the direction perpendicular to a terminal extending direction according to the embodiment.
Figure 4:
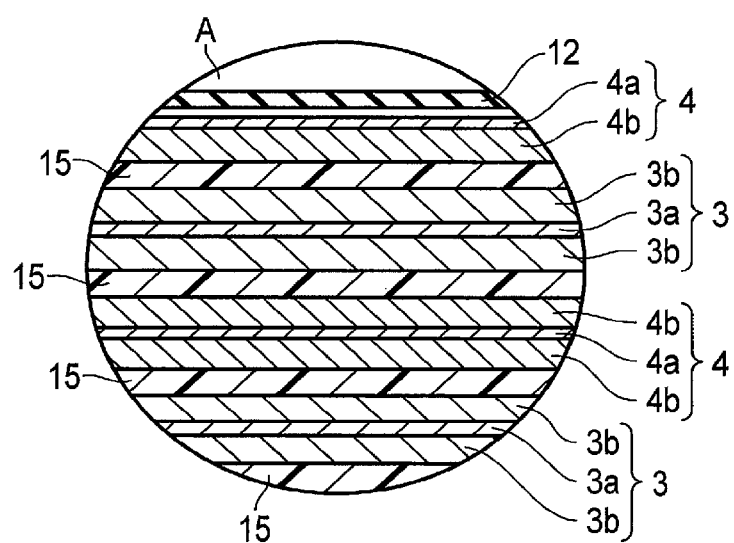
FIG. 4 is an enlarged sectional view showing a portion A in FIG. 3.

FIGS. 3 and 4 show an example of a secondary battery using a container member made of a laminated film.

As shown in FIGS. 3 and 4, the flat wound electrode group 1 is stored in a sack-shaped container member 12 made of a laminated film including a metal layer interposing between two resin films. The flat wound electrode group 1 is formed by spirally winding a stacked structure obtained by stacking the negative electrode 4, an electrolyte-containing layer 15, the positive electrode 3, and the electrolyte-containing layer 15 from the outside, and pressing the stacked structure. The outermost negative electrode 4 has an arrangement in which a negative electrode layer (negative electrode active material-containing layer) 4*b* containing a negative electrode active material on one surface on the inner side of a negative electrode current collector 4*a*, as shown in FIG. 4, and the remaining negative electrodes 4 are arranged by forming the negative electrode layers 4*b* on both surfaces of the negative electrode current collector 4*a*. The positive electrode 3 is arranged by forming positive electrode layers (positive electrode active material-containing layers) 3*b* on both surfaces of a positive electrode current collector 3*a*.

Near the outer end of the wound electrode group 1, a negative electrode terminal 13 is connected to the negative electrode current collector 4*a* of the outermost negative electrode 4, and a positive electrode terminal 14 is connected to the positive electrode current collector 3*a* of the positive electrode 3 on the inner side. The negative electrode terminal 13 and the positive electrode terminal 14 extend outward from the opening portion of the sack-shaped container 12. The opening portion of the sack-shaped container 12 is heat-sealed, thereby sealing the wound electrode group 1. At the time of heat-sealing, the negative electrode terminal 13 and the positive electrode terminal 14 are sandwiched by the sack-shaped container member 12 in the opening portion.

Examples of each of the electrolyte-containing layers 5 and 15 include a composite electrolyte layer and a separator holding a liquid or gel electrolyte. Both the composite electrolyte layer and the separator may be used for the electrolyte-containing layer 5 or 15.

A secondary battery having a bipolar structure will be described next. The secondary battery further includes a current collector with the first surface and the second surface located on the opposite side of the first surface. As the current collector, a current collector similar to the positive or negative electrode current collector of the secondary battery is usable. The secondary battery has a bipolar structure in which a positive electrode active material-containing layer is formed on the first surface of the current collector, and a negative electrode active material-containing layer is formed on the second surface. A composite electrolyte layer exists on the surface of at least one of the positive electrode active material-containing layer and the negative electrode active material-containing layer. As a result, at least part of the composite electrolyte layer is located between the positive electrode active material-containing layer and the negative electrode active material-containing layer. As the positive and negative electrode active material-containing layers, positive and negative electrode active material-containing layers similar to those described for the secondary battery are usable.

The composite electrolyte improves the ionic conductivity in the secondary battery having the bipolar structure. This can implement a high-voltage secondary battery by one single battery without connecting a plurality of single batteries in series. Furthermore, the composite electrolyte can take the form of a gel, and thus prevent a short circuit caused via an electrolytic solution in the bipolar cell.

Figure 5:
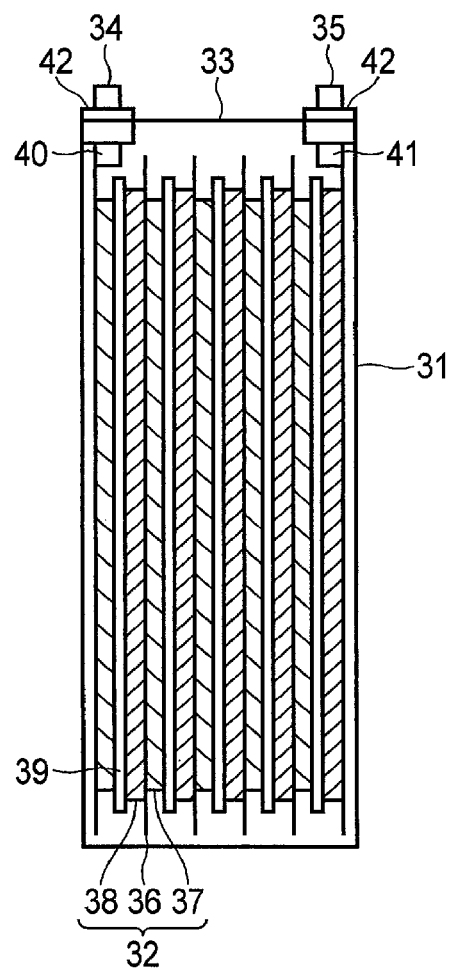
FIG. 5 is a sectional view showing another example of the secondary battery according to the embodiment.

FIG. 5 shows an example of a bipolar secondary battery. The secondary battery shown in FIG. 5 includes a metal container 31, an electrode body 32 having a bipolar structure, a sealing plate 33, a positive electrode terminal 34, and a negative electrode terminal 35. The metal container 31 has a bottomed square tubular shape. As the metal container, a metal container similar to that described for the secondary battery is usable. The electrode body 32 having the bipolar structure includes a current collector 36, a positive electrode layer (positive electrode active material-containing layer) 37 stacked on one surface (first surface) of the current collector 36, and a negative electrode layer (negative electrode active material-containing layer) 38 stacked on the other surface (second surface) of the current collector 36. A composite electrolyte layer 39 is arranged between the electrode bodies 32 each having the bipolar structure. The positive electrode terminal 34 and the negative electrode terminal 35 are fixed to the sealing plate 33 via an insulating member 42. One end of a positive electrode lead 40 is electrically connected to the positive electrode terminal 34 and the other end is electrically connected to the current collector 36. One end of a negative electrode lead 41 is electrically connected to the negative electrode terminal 35 and the other end is electrically connected to the current collector 36.

Since the secondary battery according to the above-described second embodiment includes the positive electrode according to the first embodiment, it is possible to obtain excellent charge-and-discharge cycle life, discharge rate performance, and low-temperature performance.

Third Embodiment

A battery module according to the third embodiment includes a plurality of secondary batteries according to the second embodiment.

Examples of the battery module can include a battery module including plural single batteries electrically connected in series and/or in parallel as constituent units, and a battery module including a first unit formed from plural single batteries electrically connected in series or a second unit formed from plural single batteries electrically connected in parallel. The battery module may include at least one of the forms.

Examples of the form in which plural secondary batteries are electrically connected in series and/or in parallel include a form in which plural batteries each including a container member are electrically connected in series and/or in parallel and a form in which plural electrode groups or bipolar electrode bodies stored in a common case are electrically connected in series and/or in parallel. As a detailed example of the former, the positive electrode terminals and the negative electrode terminals of plural secondary batteries are connected by bus bars made of a metal (for example, aluminum, nickel, or copper). As a detailed example of the latter, plural electrode groups or bipolar electrode bodies are stored in one case in a state in which they are electrochemically insulated by partitions, and the electrode groups or bipolar electrode bodies are electrically connected in series. If secondary batteries are used, when the number of batteries electrically connected in series falls within the range of 5 to 7, satisfactory voltage compatibility with a lead storage battery can be obtained. To further improve the voltage compatibility with a lead storage battery, a structure including five or six single batteries connected in series is preferable.

As the case storing the battery module, a metal can made of an aluminum alloy, iron, stainless steel, or the like, a plastic container, or the like can be used. The plate thickness of the container is desirably 0.5 mm or more.

Figure 6:
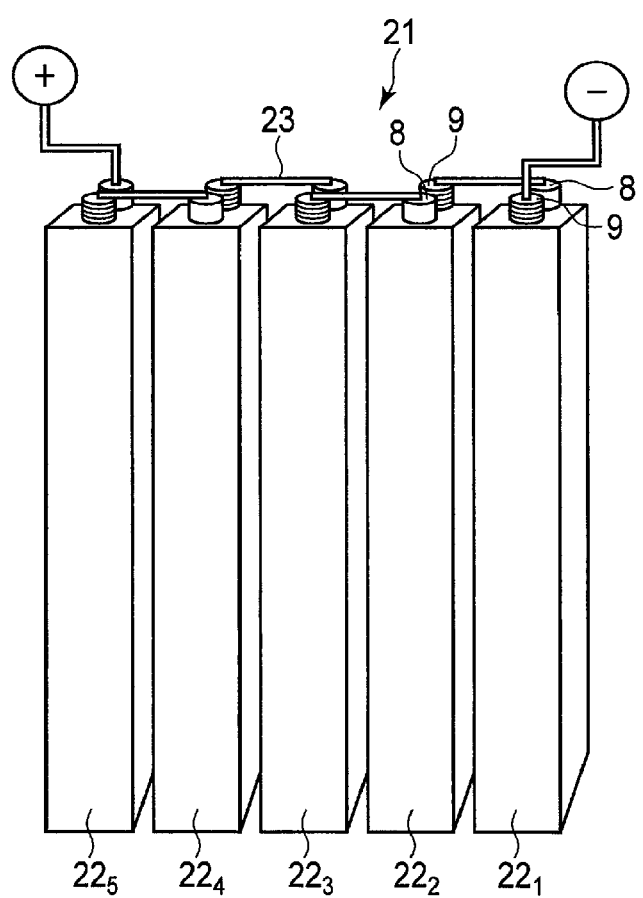
FIG. 6 is a perspective view showing an example of a battery module including secondary batteries according to the embodiment.

An example of a battery module will be described with reference to FIG. 6. A battery module 21 shown in FIG. 6 includes, as single batteries, a plurality of rectangular secondary batteries $22_1$ to $22_5$ shown in FIG. 1. A positive electrode tab 8 of the battery $22_1$ and a negative electrode tab 9 of the battery $22_2$ located adjacent to the battery $22_1$ are electrically connected by a lead or bus bar 23. In addition, a positive electrode tab 8 of the battery $22_2$ and a negative electrode tab 9 of the battery $22_3$ located adjacent to the battery $22_2$ are electrically connected by a lead or bus bar 23. The batteries $22_1$ to $22_5$ are thus electrically connected in series.

Since the battery module according to the above-described third embodiment includes the secondary batteries including the positive electrode according to the first embodiment, it is possible to obtain excellent charge-and-discharge cycle life, discharge rate performance, and low-temperature performance.

Fourth Embodiment

A battery pack according to the fourth embodiment can include one or plural secondary batteries (single batteries) according to the second embodiment. The plural secondary batteries can be electrically connected in series, in parallel, or in a combination of series connection and parallel connection, thereby forming a battery module. The battery pack according to the fourth embodiment may include plural battery modules.

The battery pack according to the fourth embodiment can further include a protective circuit. The protective circuit has a function of controlling charge/discharge of a secondary battery. Alternatively, a circuit included in a device (for example, an electronic device or an automobile) that uses a battery pack as a power supply can be used as the protective circuit of the battery pack.

The battery pack according to the fourth embodiment can further include as an external power distribution terminal an external energizing terminal. The external power distribution terminal is configured to output a current from the secondary battery to the outside and input a current to the secondary battery. In other words, when the battery pack is used as a power supply, a current is supplied to the outside via the external power distribution terminal. Additionally, when charging the battery pack, a charge current (including regenerative energy of the power of a vehicle such as an automobile) is supplied to the battery pack via the external power distribution terminal.

Figure 7:
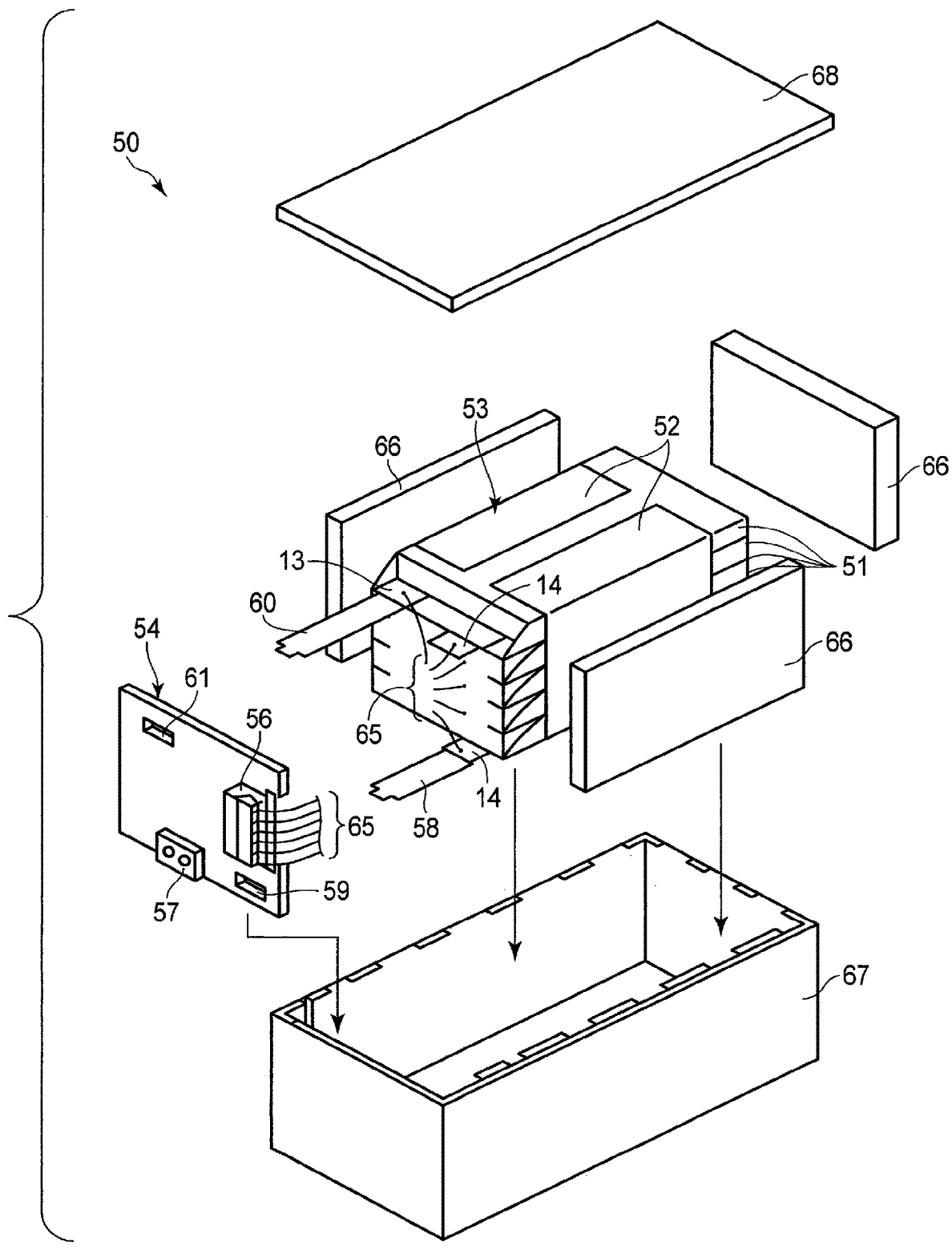
FIG. 7 is an exploded perspective view showing a battery pack according to the embodiment.
Figure 8:
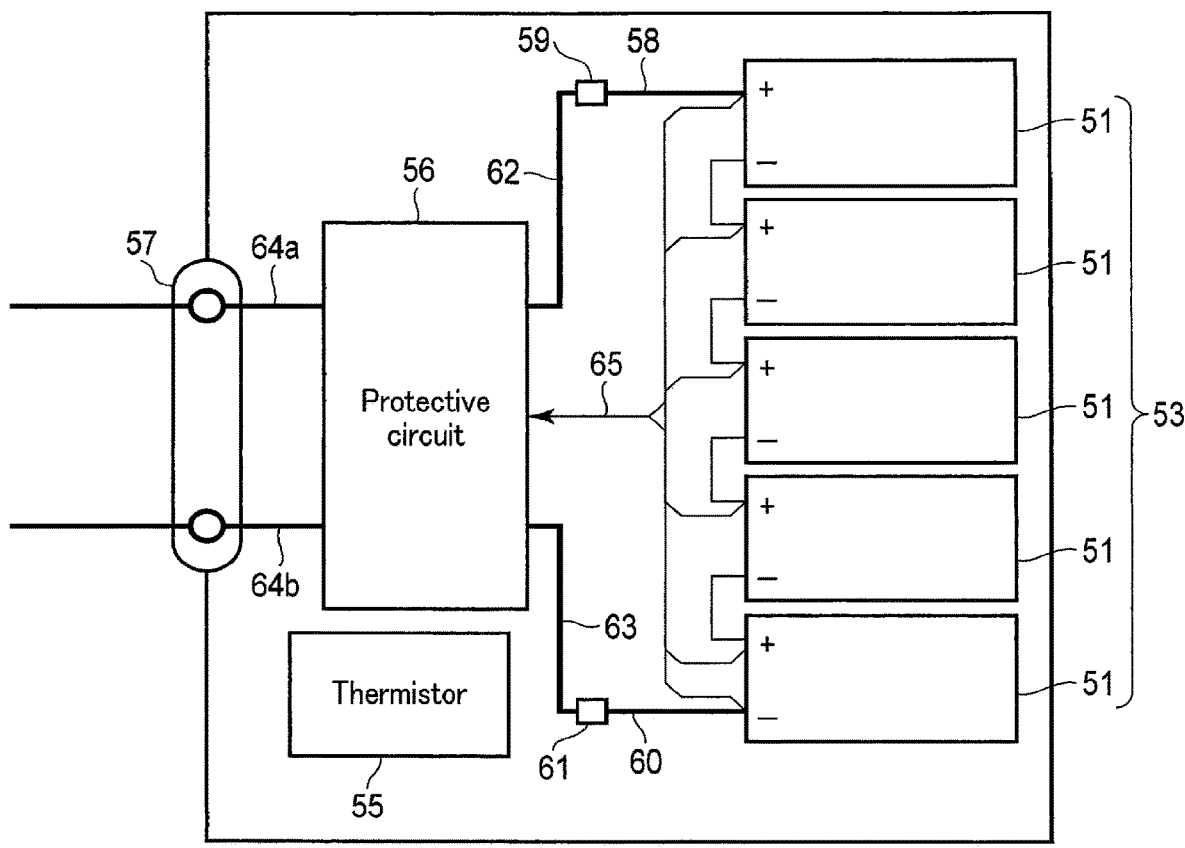
FIG. 8 is a block diagram showing the electric circuit of the battery pack shown in FIG. 7.

FIGS. 7 and 8 show an example of a battery pack 50. FIG. 7 is an exploded perspective view of an example of the battery pack 50. FIG. 8 is a block diagram showing an electric circuit of the battery pack 50.

The battery pack 50 shown in FIGS. 7 and 8 includes single batteries 51. The single batteries 51 are flat nonaqueous electrolyte batteries described with reference to FIG. 3.

Plural single batteries 51 are stacked so that the negative electrode terminals 13 and the positive electrode terminals 14 extended outside are arranged in the same direction, and fastened with an adhesive tape 52 to configure a battery module 53. The single batteries 51 are electrically connected to each other in series as shown in FIG. 8.

A printed wiring board 54 is arranged to face opposite to the side plane of the single battery 51 where the negative electrode terminal 13 and the positive electrode terminal 14 extend out from. A thermistor 55, a protective circuit 56, and a power distribution terminal 57 to an external device as the external power distribution terminal are mounted on the printed wiring board 54 as shown in FIG. 8. An electric insulating plate (not shown) is attached to the surface of the printed wiring board 54 facing the battery module 53 to avoid unnecessary connection of the wires of the battery module 53.

A positive electrode-side lead 58 is connected to the positive electrode terminal 14 located at the bottom layer of the battery module 53 and the distal end of the lead 58 is inserted into a positive electrode-side connector 59 of the printed wiring board 54 so as to be electrically connected. A negative electrode-side lead 60 is connected to the negative electrode terminal 13 located at the top layer of the battery module 53 and the distal end of the lead 60 is inserted into an negative electrode-side connector 61 of the printed wiring board 54 so as to be electrically connected. The connectors 59 and 61 are connected to the protective circuit 56 through wires 62 and 63 formed on the printed wiring board 54.

The thermistor 55 detects the temperature of the single batteries 51, and the detection signal is sent to the protective circuit 56. The protective circuit 56 can shut down a plus-side wire 64a and a minus-side wire 64b between the protective circuit 56 and the power distribution terminal 57 to an external device under a predetermined condition. The predetermined condition indicates, for example, the case where the temperature detected by the thermistor 55 becomes a predetermined temperature or more. Another example of the predetermined condition indicates the case where the over-charge, over-discharge, or over-current of the single batteries 51 is detected. The detection of the over-charge and the like is performed on each of the single batteries 51 or the entire battery module 53. When each of the single batteries 51 is detected, the battery voltage may be detected, or a positive electrode or negative electrode potential may be detected. In the latter case, a lithium electrode to be used as a reference electrode is inserted into each of the single batteries 51. In the case of the battery pack of FIGS. 7 and 8, wires 65 for voltage detection are connected to each of the single batteries 51. Detection signals are sent to the protective circuit 56 through the wires 65.

Protective sheets 66 made of rubber or resin are arranged on three side planes of the battery module 53 except the side plane from which the positive electrode terminal 14 and the negative electrode terminal 13 protrude out from.

The battery module 53 is housed in a housing container 67 together with each of the protective sheets 66 and the printed wiring board 54. That is, the protective sheets 66 are arranged on both internal surfaces in a long side direction and on one internal surface in a short side direction of the housing container 67. The printed wiring board 54 is arranged on the internal surface on the opposite side in a short side direction. The battery module 53 is located in a space surrounded by the protective sheets 66 and the printed wiring board 54. A lid 68 is attached to the upper surface of the housing container 67.

In order to fix the battery module 53, a heat-shrinkable tape may be used in place of the adhesive tape 52. In this case, the battery module is bound by placing the protective sheets on the both sides of the battery module, revolving the heat-shrinkable tape, and thermally shrinking the heat-shrinkable tape.

In FIGS. 7 and 8, the form in which the single batteries 51 are connected in series is shown. However, in order to increase the battery capacity, the batteries may be connected in parallel. Alternatively, the batteries may be formed by combining series connection and parallel connection. The assembled battery pack can be connected in series or in parallel.

The battery pack shown in FIGS. 7 and 8 includes one battery module. The battery pack according to the fourth embodiment may include a plurality of battery modules. The plurality of battery modules are electrically connected in series, in parallel, or in a combination of series connection and parallel connection.

The form of the battery pack is appropriately changed in accordance with the application purpose. The battery pack according to this embodiment is preferably used for an application purpose requiring that excellent cycle performance is obtained at the time of a large current discharging. More specifically, the battery pack is used as a power supply for a digital camera, a battery for a vehicle such as a two- or four-wheeled hybrid electronic automobile, a two- or four-wheeled electronic automobile, an electric bicycle, or a railway vehicle (for example, an electric train), or a stationary battery. Especially, the battery pack is preferably used as an onboard battery installed in a vehicle.

Since the battery pack according to the above-described fourth embodiment includes the secondary battery including the positive electrode according to the first embodiment, it is possible to obtain excellent charge-and-discharge cycle life, discharge rate performance, and low-temperature performance.

Fifth Embodiment

A vehicle according to the fifth embodiment includes one or two or more secondary batteries according to the second embodiment, the battery module according to the third embodiment, or the battery pack according to the fourth embodiment.

According to the fifth embodiment, in a vehicle such as an automobile in which the battery pack is installed, the battery pack is configured to, for example, collect regenerative energy of the power of the vehicle. The vehicle may include a mechanism of converting the kinetic energy of the vehicle into regenerative energy.

Figure 9:
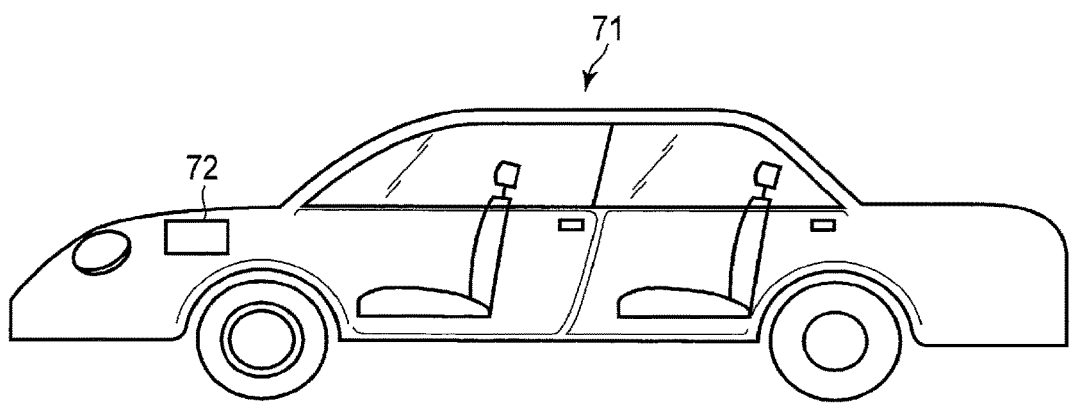
FIG. 9 is a schematic view showing an example of a vehicle in which a secondary battery is mounted according to the embodiment.

FIG. 9 shows an example of an automobile including a battery pack as an example according to the fourth embodiment.

Figure 10:
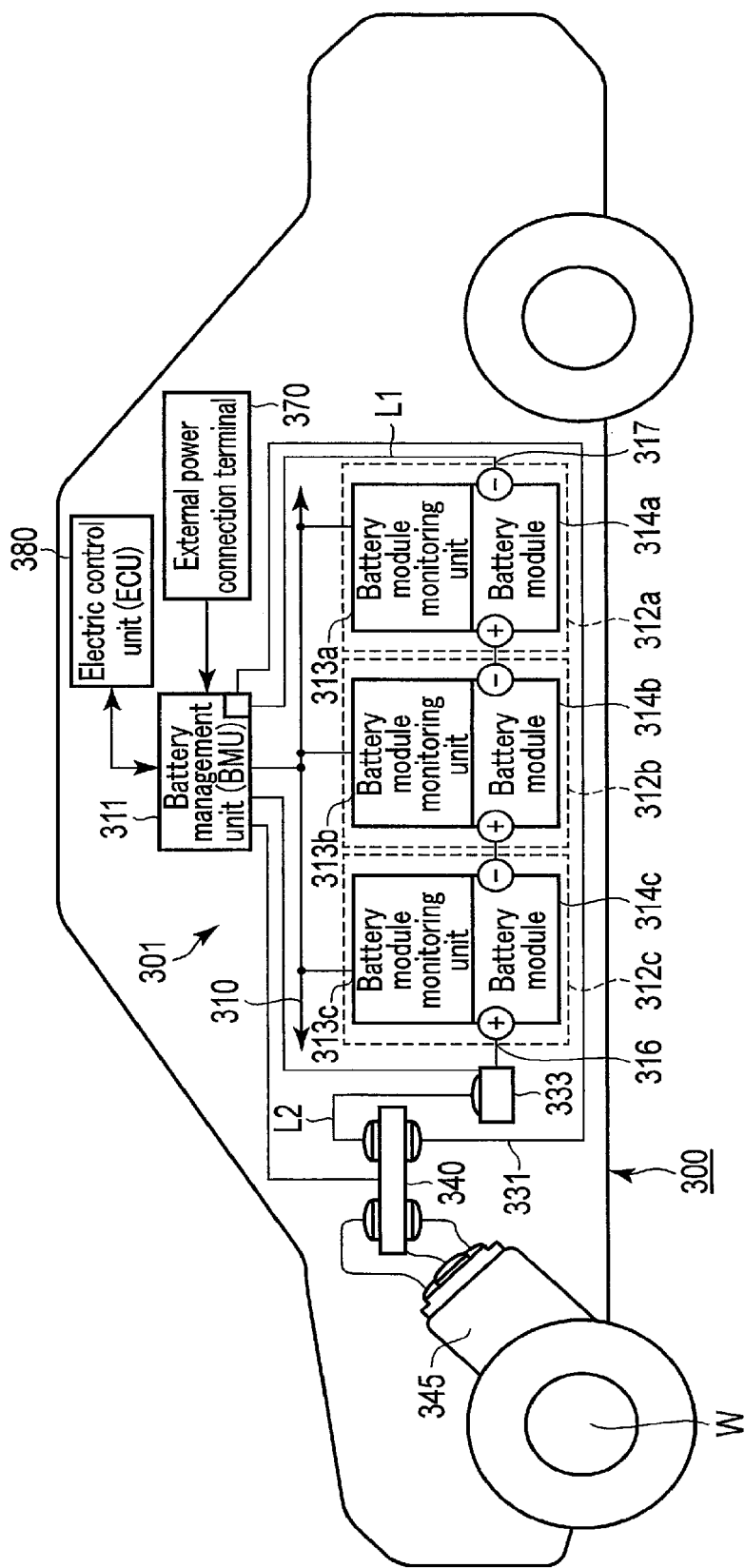
FIG. 10 is a view schematically showing another example of the vehicle according to the embodiment.

An automobile 71 shown in FIG. 9 includes a battery pack 72 as an example according to the fourth embodiment, that is installed in an engine room on the front side of the vehicle body. The mount position of the battery pack in the automobile is not limited to the engine room. For example, the battery pack can be installed in the rear side of the vehicle body or under a seat of the automobile. FIG. 10 is a view schematically showing the arrangement of an example of the vehicle according to the embodiment. A vehicle 300 shown in FIG. 10 is an electric automobile.

The vehicle 300, shown in FIG. 10, includes a vehicle body, a vehicle power source 301, a vehicle ECU (electric control unit) 380, which is a master controller of the vehicle power source 301, an external terminal (an external power connection terminal) 370, an inverter 340, and a drive motor 345.

The vehicle 300 includes the vehicle power source 301, for example, in the engine compartment, in the rear sections of the automobile body, or under a seat. In FIG. 10, the position of the vehicle power source 301 installed in the vehicle 300 is schematically shown.

The vehicle power source 301 includes plural (for example, three) battery packs 312a, 312b and 312c, BMU (a battery management unit) 311, and a communication bus 310.

The three battery packs 312a, 312b and 312c are electrically connected to each other in series. The battery pack 312a includes a battery module 314a and a battery module monitoring unit (VTM: voltage temperature monitoring) 313a. The battery pack 312b includes a battery module 314b, and a battery module monitoring unit 313b. The battery pack 312c includes a battery module 314c, and a battery module monitoring unit 313c. The battery packs 312a, 312b and 312c can each be independently removed, and may be exchanged by a different battery pack.

Each of the battery modules 314a to 314c includes plural single batteries connected to each other in series. At least one of the plural single batteries is the secondary battery according to the embodiment. The battery modules 314a to 314c each perform charging and discharging through a positive electrode terminal 316 and a negative electrode terminal 317.

In order to collect information concerning security of the vehicle power source 301, the battery management unit 311 performs communication with the battery module monitoring units 313a to 313c and collects information such as voltages or temperatures of the single batteries included in the battery modules 314a to 314c included in the vehicle power source 301.

The communication bus 310 is connected between the battery management unit 311 and the battery module monitoring units 313a to 313c. The communication bus 310 is configured so that multiple nodes (i.e., the battery management unit and one or more battery module monitoring units) share a set of communication lines. The communication bus 310 is, for example, a communication bus configured based on CAN (Control Area Network) standard.

The battery module monitoring units 313a to 313c measure a voltage and a temperature of each single battery in the battery modules 314a to 314c based on communications from the battery management unit 311. It is possible, however, to measure the temperatures only at several points per battery module, and the temperatures of all of the single batteries need not be measured.

The vehicle power source 301 may also have an electromagnetic contactor (for example, a switch unit 333 shown in FIG. 10) for switching connection between the positive electrode terminal and the negative electrode terminal. The switch unit 333 includes a precharge switch (not shown), which is turned on when the battery modules 314a to 314c are charged, and a main switch (not shown), which is turned on when battery output is supplied to a load. The precharge switch and the main switch include a relay circuit (not shown), which is turned on or off based on a signal supplied to a coil located near the switch element.

The inverter 340 converts an inputted DC (direct current) voltage to a three-phase AC (alternate current) high voltage for driving a motor. Three-phase output terminal(s) of the inverter 340 is connected to each three-phase input terminal of the drive motor 345. The inverter 340 controls an output voltage based on control signals from the battery management unit 311 or the vehicle ECU 380, which controls the whole operation of the vehicle.

The drive motor 345 is rotated by electric power supplied from the inverter 340. The rotation is transferred to an axle and driving wheels W, for example, through a differential gear unit.

The vehicle 300 also includes a regenerative brake mechanism, though not shown. The regenerative brake mechanism rotates the drive motor 345 when the vehicle 300 is braked, and converts kinetic energy into regenerative energy, as electric energy. The regenerative energy, recovered in the regenerative brake mechanism, is inputted into the inverter 340 and converted to direct current. The direct current is inputted into the vehicle power source 301.

One terminal of a connecting line L1 is connected through a current detector (not shown) in the battery management unit 311 to the negative electrode terminal 317 of the vehicle power source 301. The other terminal of the connecting line L1 is connected to a negative electrode input terminal of the inverter 340.

One terminal of a connecting line L2 is connected through the switch unit 333 to the positive electrode terminal 316 of the vehicle power source 301. The other terminal of the connecting line L2 is connected to a positive electrode input terminal of the inverter 340.

The external terminal 370 is connected to the battery management unit 311. The external terminal 370 is able to connect, for example, to an external power source.

The vehicle ECU 380 cooperatively controls the battery management unit 311 together with other units in response to inputs operated by a driver or the like, thereby performing the management of the whole vehicle. Data concerning the security of the vehicle power source 301, such as a remaining capacity of the vehicle power source 301, are transferred between the battery management unit 311 and the vehicle ECU 380 through communication lines.

The vehicle according to the fifth embodiment includes the battery pack with the secondary batteries according to the embodiment, and the battery pack (for example, the battery packs 312a, 312b, and 312c) has excellent charge-and-discharge cycle life, discharge rate performance, and low-temperature performance. Therefore, a reliable vehicle having excellent charge-and-discharge performance can be obtained. In addition, each battery pack is inexpensive and safe. It is therefore possible to suppress the cost of the vehicle and increase the safety.

Sixth Embodiment

According to the sixth embodiment, there is provided an electrode containing active material particles, polymer fibers, and inorganic solid particles. The average fiber diameter of the polymer fibers ranges from 1 nm to 100 nm. That is, the first embodiment is applied to the positive electrode, but may be applied to the negative electrode. Further, the first embodiment may be applied to both of the positive electrode and the negative electrode.

The electrode according to the embodiment will be described below.

The reason why the average fiber diameter of the polymer fibers is specified will be described. If the average fiber diameter exceeds 100 nm, it is difficult to distribute the polymer fibers to fine portions in the electrode such as a negative electrode. In addition, since the specific surface area of the polymer fibers is short, the amount of the electrolyte held by the polymer fibers becomes small. Consequently, the low temperature performance or discharge rate performance of the battery lowers. The average fiber diameter is desirably small. However, if the average fiber diameter is smaller than 1 nm, dispersion of the fibers in the electrode is insufficient, and the fibers thus cannot uniformly hold the electrolyte. The average fiber diameter more preferably ranges from 5 nm to 50 nm.

The polymer fibers having an average fiber diameter of ranging from 1 nm to 100 nm have a nano size fiber diameter, and are thus readily dispersed in the electrode such as a negative electrode to form fine through holes arranged in a mesh shape. As a result, an electrolyte such as a liquid electrolyte or gel electrolyte is supported or held by the polymer fibers. Thus, it is possible to suppress the disconnection of ion conduction caused by expansion/contraction of the active material particles, and decrease the ion conduction resistance in the electrode. Therefore, a secondary battery including this electrode can improve the charge and discharge cycle life, the discharge rate performance, and the low temperature performance.

The polymer fibers are preferably cellulose fibers (cellulose nanofibers). The cellulose fibers have an average fiber diameter of ranging from 1 nm to 100 nm, that is, a nano size fiber diameter, and have an extremely high aspect ratio (ranging from 100 to 10,000), and can thus firmly hold a liquid electrolyte in the fine through holes arranged in a mesh shape by the fibers. If the polymer fibers include cellulose fibers, the aspect ratio of the polymer fibers can be set to, for example, an extremely large value ranging from 100 to 10,000, thereby encouraging the formation of fine through holes arranged in a mesh shape by the polymer fibers. As a result, extraction of the electrolyte from the electrode is further suppressed, and it is thus possible to further decrease the ion conduction resistance in the electrode. Therefore, the secondary battery including the electrode can further improve the charge and discharge cycle life, the discharge rate performance, and the low temperature performance.

If the inorganic solid particles contain at least one material selected from the group consisting of $Al_2O_3$, $TiO_2$, $ZrO_2$, and a phosphate compound, they can conduct lithium ions without solvation. This makes it possible to encourage the ion conduction in the electrode.

The inorganic solid particles desirably contain at least one material selected from the group consisting of $Al_2O_3$, $TiO_2$, $ZrO_2$, and a phosphate compound. As the phosphate compound, for example, $AlPO_4$, $Li_3PO_4$, a material having a NASICON structure and expressed as $Li_{1+y}Al_xM_{2-x}(PO_4)_3$ (M represents at least one element selected from the group consisting of Ti, Ge, Sr, Sn, Zr, and Ca for $0 \leq x \leq 1$ and $0 \leq y \leq 1$) can be used. The phosphate compound having the NASICON structure and expressed as $Li_{1+y}Al_xM_{2-x}(PO_4)_3$ has excellent stability in the atmosphere, and high lithium ion conductivity.

The phosphate compound desirably contains a material having a NASICON structure and expressed as $Li_{1+y}Al_xM_{2-x}(PO_4)_3$ (M represents at least one element selected from the group consisting of Ti, Ge, Sr, Sn, Zr, and Ca for $0 \leq x \leq 1$ and $0 \leq y \leq 1$). It is considered that on an interface among the active material particles, the inorganic solid particles, and the liquid or gel electrolyte held in the fine through holes formed between the polymer fibers, lithium ion concentration which is not influenced by solvation increases, and high speed lithium ion conduction occurs, thereby decreasing the ion conduction resistance and the resistance of the active material particle interface, in the electrode.

The average particle size of the inorganic solid particles can be set to 1 μm or less. The average particle size more preferably ranges from 0.01 μm to 1 μm, and much more preferably ranges from 0.05 μm to 0.6 μm. In this range, the lithium ion conductivity in the electrode is improved, thereby decreasing the resistance in the electrode. By compositing the polymer fibers and the inorganic solid particles, high speed ionic conductivity can be maintained even in the electrode that significantly expands/contracts. It is considered that especially on an interface among the high potential active material particles, the inorganic solid particles having an average particle size of 1 μm or less, and the liquid or gel electrolyte held in the fine through holes arranged between the polymer fibers, the lithium ion concentration which is not influenced by solvation increases, and high speed lithium ion conduction occurs, thereby decreasing the ion conduction resistance and the resistance of the active material interface, in the electrode.

The content of the polymer fibers in the active material containing layer desirably ranges from 0.2 wt % to 10 wt %. If the content of the polymer fibers exceeds 10 wt %, the contents of the remaining components relatively decrease, and thus the density of the electrode may lower. If the content of the polymer fibers is set to be smaller than 0.2 wt %, the effect of the polymer fibers having an average fiber diameter of ranging from 1 nm to 100 nm cannot be obtained, thereby degrading the charge and discharge cycle life, the discharge rate performance, and the low temperature performance. The content more preferably ranges from 0.2 wt % to 5 wt %, and much more preferably ranges from 0.3 wt % to 2 wt %.

The content of the inorganic solid particles in the active material containing layer preferably ranges from 0.5 wt % to 10 wt %. If the content of the inorganic solid particles exceeds 10 wt %, the contents of the remaining components relatively decrease, and thus the density of the electrode may lower. If the content of the inorganic solid particles is set to be smaller than 0.5 wt %, the effect of the inorganic solid particles cannot be obtained, thereby degrading the charge and discharge cycle life, the discharge rate performance, and the low temperature performance. The content more preferably ranges from 1 wt % to 6 wt %.

When the content of the polymer fibers ranges from 0.2 wt % to 5 wt %, and the content of the inorganic solid particles ranges from 0.5 wt % to 10 wt %, it is possible to decrease the lithium ion conduction resistance and the electron conduction resistance, in the electrode while keeping the electrode density high.

The electrode can include a current collector, and an active material containing layer that is supported by at least one principal surface, that is, one or both surfaces of the current collector. The active material containing layer contains active material particles, polymer fibers having an average fiber diameter of ranging from 1 nm to 100 nm, and inorganic solid particles. The active material containing layer can also contain a conductive agent and a binder.

The electrode can include an electrolyte. As the polymer capable of making a gel of the electrolyte in the electrode, for example, a polymer that produces a gel electrolyte with a presence of carbonate, or the like can be used. Examples of the polymer include polyacrylonitrile (PAN), polyethylene oxide (PEO), polyvinylidene fluoride (PVdF), and polymethyl metacrylate. The gel polymer electrolyte using polyacrylonitrile is preferable since it has high ionic conductivity to improve the discharge performance and low temperature performance. The ratio of the gel polymer electrolyte to the active material containing layer preferably ranges from 1 wt % to 10 wt %. If the ratio falls outside the range, the low temperature performance or the discharge performance may lower.

An aluminum foil or an aluminum alloy foil can be used as the current collector. Examples of the aluminum or aluminum alloy foil include foils similar to those described in the negative electrode current collector of the second embodiment.

The active material particles are not particularly limited as long as it is possible to allow lithium ions to be inserted/extracted. Examples of the negative electrode active material include materials similar to those described in the second embodiment.

For the reason similar to that described in the second embodiment, the specific surface area of the negative electrode preferably ranges from 3 $m^2/g$ to 50 $m^2/g$, more preferably ranges from 5 m²/g to 50 m²/g, and much more preferably ranges from 1 m²/g to 20 m²/g.

For the reason similar to that described in the second embodiment, the porosity of the negative electrode (except for the current collector) desirably ranges from 20% to 50%. The porosity more preferably ranges from 25% to 40%.

Examples of the conductive agent include agents similar to those described in the negative electrode of the second embodiment. A carbon nanotube, and a carbon nanofiber that is one example of carbon fibers tend to become entangled with active material particles, and can adequately cover the surfaces of the active material particles.

Examples of the binder include binders similar to those described in the negative electrode of the second embodiment. The binder can impart the flexibility to an active material containing layer including polymer fibers. PVdF and styrene butadiene rubber are excellent in improving the flexibility.

One type or two or more types of components such as an active material, polymer fibers, inorganic solid particles, a conductive agent, and a binder can be contained in the above described electrode.

As the mixing ratio of the negative electrode active material, the conductive agent, the binder, the polymer fibers, and the inorganic solid particles, the content of the negative electrode active material preferably ranges from 80 wt % to 95 wt %, the content of the conductive agent preferably ranges from 1 wt % to 8 wt %, the content of the binder preferably ranges from 0.5 wt % to 3 wt %, the content of the polymer fibers preferably ranges from 0.2 wt % to 5 wt %, and the content of the inorganic solid particles preferably ranges from 0.5 wt % to 10 wt %.

The negative electrode is produced by, for example, dispersing particles of the negative electrode active material, the polymer fibers, the inorganic solid particle, the conductive agent, and the binder in a solvent, applying the obtained slurry to the current collector, drying the slurry, and performing press (for example, heating press). Alternatively, particles of the negative electrode active material, the conductive agent, and the binder are dispersed in a solvent to obtain a first slurry. Further, the polymer fibers and the inorganic solid particles are dispersed in a solvent to obtain a second slurry. The first slurry is applied to a current collector, and then the second slurry is applied to a layer of the first slurry on the current collector. Subsequently, these slurries are dried, and a negative electrode is obtained by performing press (for example, heating press). The application of the slurry to the current collector is performed by, for example, spraying, a device of die coater, or the like.

A method of measuring the content of the polymer fibers in the active material containing layer will be described below. The active material containing layer peeled from the current collector is ground using a mortar or the like, and the thus obtained ground product is dispersed in water to separate the polymer fibers by using a specific gravity difference. The polymer fibers in a supernatant are dried at 100° C. for 12 hours, and the weight of the polymer fibers is measured, thereby obtaining the content of the polymer fibers in the active material containing layer.

The polymer fibers whose weight has been measured by the above described method are observed by an SEM (Scanning Electron Microscope) at a magnification of 10,000, and widths are measured at positions of 25%, 50%, and 75% of the full length of the polymer fibers within the field of view. The average of the values of the measured widths is obtained as an average fiber diameter. Measurement is performed for all the polymer fibers existing within the field of view.

A method of measuring the content of the inorganic solid particles in the active material containing layer will be described below. The active material containing layer having undergone an electrolyte removal treatment by a method (to be described later) is ground using a mortar or the like, and the thus obtained ground product is dispersed in water to separate the polymer fibers and the conductive agent using a specific gravity difference. The polymer fibers and conductive agent in a supernatant are removed. The precipitate is washed by dimethyl carbonate to remove the binder. Subsequently, the obtained material is dried, and particle size distribution data is obtained for the thus obtained powder by laser diffraction (to be described later). Based on the obtained particle size distribution data, the content of the inorganic solid particles in the active material containing layer is calculated.

The average primary particle sizes of the active material particles and the inorganic solid particles are measured by the following method. That is, a laser diffraction particle size analyzer (SALD 300 of Shimadzu corporation, or an apparatus having the equivalent function) is used to perform measurement by a method of adding about 0.1 g of a sample, a surfactant, and 1 to 2 mL of distilled water to a beaker, sufficiently stirring them, injecting the mixture into a water stirring tank, measuring a luminous intensity distribution 64 times at an interval of 2 sec, and analyzing particle size distribution data.

With respect to the electrode included in the secondary battery, when the average fiber diameter of the polymer fibers, and the like are confirmed, the electrode is extracted from the secondary battery by the following method. That is, the secondary battery is disassembled in a glove box filled with argon to extract the electrode. The active material containing layer is separated from the current collector of the extracted electrode. The active material containing layer is washed by dimethyl carbonate to remove the electrolyte, and dried. After that, the average fiber diameter of the polymer fibers, and the like are confirmed.

According to the sixth embodiment, there is provided an electrode containing active material particles, polymer fibers having an average fiber diameter of ranging from 1 nm to 100 nm, and inorganic solid particles. The electrode of the sixth embodiment can suppress the increase in the ion conduction resistance caused by expansion/contraction of the active material particles. Therefore, a secondary battery including the electrode can improve the charge and discharge cycle life, the discharge rate performance, and the low temperature performance.

In the secondary battery of the second embodiment, the electrode of the sixth embodiment can be used as the negative electrode in place of the negative electrode not containing polymer fibers and inorganic solid particles. In this case, a positive electrode not containing polymer fibers or inorganic solid particles can be used for the positive electrode of the secondary battery. The positive electrode not containing polymer fibers or inorganic solid particles has configuration similar to that of the positive electrode of the first embodiment except for not containing polymer fibers or inorganic solid particles.

The secondary battery using the electrode of the sixth embodiment as at least one of the positive electrode and the negative electrode can improve the charge and discharge cycle life, the discharge rate performance, and the low temperature performance. The secondary battery can be applied to the third battery module, the battery pack of the fourth embodiment, or the vehicle of the fifth embodiment. As a result, it is possible to realize a battery module and a battery pack each having excellent charge and discharge cycle life, discharge rate performance, and low temperature performance, and to provide a reliable vehicle having excellent charge and discharge performance.

The electrode of the sixth embodiment may include a gel electrolyte. The electrode including a gel electrolyte can be obtained by, for example, impregnating at least one of the positive electrode and negative electrode prepared by the above-described method with an electrolyte composition containing a liquid electrolyte and a polymer, and then performing a heat treatment, as needed. The gelation treatment may be applied to a single electrode, or may be applied to an electrode group. The polymer is not particularly limited as long as it makes a gel of the liquid electrolyte containing lithium ions, and either a chemical gel agent or a physical gel agent can be used. For example, a polymer that makes a gel electrolyte with a presence of carbonate such as polyacrylonitrile (PAN), polyethylene oxide (PEO), polyvinylidene fluoride (PVdF), or polymethyl metacrylate can be used. One type or two or more types of polymers can be used.

EXAMPLES

Examples of the present embodiment will be described in detail below with reference to the accompanying drawings. However, the present embodiment is not limited to the examples to be described below.

Example 1

Secondary particles of $LiNi_{0.8}Co_{0.1}Mn_{0.1}O_2$ having an average secondary particle size of 5 μm were prepared as positive electrode active material particles. 2 wt % of particles of $Li_{1.3}Al_{0.3}Zr_{1.7}(PO_4)_3$ having an average primary particle diameter of 0.4 μm serving as inorganic solid powder, 0.5 wt % of cellulose nanofiber having an average fiber diameter of 10 nm, 5 wt % of graphite powder serving as a conductive agent, and 3 wt % of PVdF serving as a binder were mixed with 89.5 wt % of positive electrode active material particles. The obtained mixture was dispersed in an n-methylpyrolidone (NMP) solvent to prepare a slurry. After that, the obtained slurry was applied to both surfaces of a 15 μm-thick aluminum alloy foil (purity of 99%), dried, and pressed, thereby producing a positive electrode having an electrode density of 3.1 g/cm³.

As negative electrode active material particles, particles of $Li_4Ti_5O_{12}$ having an average primary particle size of 0.6 μm and a specific surface area of 10 m²/g were prepared. The negative electrode active material particles, the graphite powder having an average particle size of 6 μm and serving as a conductive agent, and PVdF serving as a binder were mixed at a weight ratio of 95:3:2 and dispersed in an n-methylpyrolidone (NMP) solvent. The mixture was stirred using a ball mill at a rotational speed of 1,000 rpm for a stirring time of 2 hours to prepare a slurry. The obtained slurry was applied to a 15 μm-thick aluminum alloy foil (purity of 99.3%), dried, and heat-pressed, thereby producing a negative electrode having a negative electrode layer density of 2.2 g/cm³. The porosity of the negative electrode except for the current collector was 35%.

A composite electrolyte layer was produced as an electrolyte-containing layer. An aqueous solution obtained by dispersing 5 wt % of particles of $Li_{1.3}Al_{0.3}Zr_{1.7}(PO_4)_3$ having an average particle size (diameter) of 1 μm and 0.5 wt % of cellulose nanofiber having an average fiber diameter of 10 nm was applied to both principal surfaces of the positive electrode active material-containing layer and both principal surfaces of the negative electrode active material-containing layer, and dried, thereby obtaining a electrolyte-containing layer precursor. An electrode group was obtained by stacking the positive electrode and the negative electrode so that the electrolyte-containing layer precursor interposed between the positive electrode active material-containing layer and the negative electrode active material-containing layer, and spirally winding the stacked structure in a flat shape. The obtained electrode group was stored in a thin metal can having a thickness of 0.25 mm and made of an aluminum alloy (Al purity of 99%).

$LiPF_6$ was dissolved, at a concentration of 1 M, in a solvent obtained by mixing propylene carbonate (PC) and diethyl carbonate (DEC) at a volume ratio of PC:DEC=1:2, thereby obtaining a liquid nonaqueous electrolyte. 80 wt % of the liquid nonaqueous electrolyte and 20 wt % of a polymer containing polyacrylonitrile (PAN) were mixed. The obtained mixed solution was injected into the metal can to permeate the pores of the positive and negative electrodes. After that, a heat treatment was performed at 60° C. for 24 hours, thereby forming a 5 μm-thick gel composite electrolyte layer. In the composite electrolyte layer, the weight ratio of particles of $Li_{1.3}Al_{0.3}Zr_{1.7}(PO_4)_3$, a gel polymer containing a nonaqueous electrolytic solution and a polymer solution of polyacrylonitrile (PAN), and cellulose nanofiber was 94:4:2.

By performing the above steps, a rectangular nonaqueous electrolyte secondary battery having the above-described structure shown in FIG. 1 and having a thickness of 13 mm, a width of 62 mm, and a height of 96 mm was obtained.

Examples 2 to 22 and Comparative Examples 1 to 8

A secondary battery was produced in accordance with the same procedure as in Example 1 except that a positive electrode active material, a negative electrode active material, the composition and content of inorganic solid particles, and the average fiber diameter and content of polymer fibers are as shown in Tables 1 and 2 below, the composition of a positive electrode active material-containing layer is as shown in Tables 3 and 4, the average secondary particle size of the positive electrode active material according to Example 12 is set to 10 μm, the average secondary particle size of the positive electrode active material according to Example 13 is set to 5 μm, and the average secondary particle size and average primary particle size of the negative electrode active material according to each of Examples 14 to 19 are respectively set to 8 μm and 0.6 μm.

Example 23

An electrode group was produced in accordance with the same procedure as in Example 1, and stored in a thin metal can similar to that described in Example 1.

A liquid nonaqueous electrolyte having the same composition as in Example 1 was injected into the metal can to permeate the pores of positive and negative electrodes. After that, the metal can was sealed, thereby obtaining a rectangular nonaqueous electrolyte secondary battery having the structure shown in FIG. 1 and the same size as in Example 1.

Example 24

Instead of the electrolyte-containing layer precursor, a separator made of a cellulose fiber nonwoven fabric having a thickness of 20 μm was used. An electrode group was produced by stacking a positive electrode and a negative electrode so that the separator interposed between a positive electrode active material-containing layer and a negative electrode active material-containing layer, and spirally winding the stacked structure in a flat shape, and stored in a thin metal can similar to that described in Example 1.

A liquid nonaqueous electrolyte having the same composition as in Example 1 was injected into the metal can to permeate the pores of the positive and negative electrodes. After that, the metal can was sealed, thereby obtaining a rectangular nonaqueous electrolyte secondary battery having the structure shown in FIG. 1 and the same size as in Example 1.

Each of the obtained secondary batteries according to the examples and comparative examples was charged up to 2.9 V at 25° C. with a constant current of 12 A, and then charged with a constant voltage of 2.9 V. When the current value reached 0.05 A, charging ended. Subsequently, the discharge capacity at the time of discharging to 1.5 V with 6 A was measured and set as a discharge capacity at 25° C. The results are shown in Tables 5 and 6.

As the charge-and-discharge cycle performance, a secondary battery was charged up to 2.9 V with a constant current of 12 A at 25° C., and then charged with a constant voltage of 2.9 V. When the current value reached 0.05 A, charging ended. Subsequently, the secondary battery was discharged to 1.5 V with 6 A. A capacity retention ratio was measured after repeating this charge-and-discharge cycle 5,000 times. Defining a discharge capacity in the first cycle as 100%, a value representing a discharge capacity in the 5,000th cycle is shown, in Tables 5 and 6, as a capacity retention ratio in the 5,000th cycle.

As the large-current discharge performance, a second battery was charged up to 2.9 V at 25° C. with a constant current of 12 A, and then charged with a constant voltage of 2.9 V. When the current value reached 0.05 A, charging ended. A capacity retention ratio at the time of 5 C (30 A) discharge was measured. The capacity retention ratio was calculated by defining a capacity at the time of 0.2 C (1.2 A) discharge as 100%.

As the low-temperature discharge performance, the secondary battery was charged up to 2.9 V with a constant current of 12 A at 25° C., and then charged with a constant voltage of 2.9 V. When the current value reached 0.05 A, charging ended. Subsequently, the capacity retention ratio at the time of discharging with 1.2 A at −30° C. was measured. The capacity retention ratio was calculated by defining a discharge capacity at 25° C. as 100%.

These measurement results are shown in Tables 5 and 6 below.

TABLE 1

| | Positive electrode active material | Negative electrode active material | Inorganic solid particles in positive electrode | | Polymer fiber | |
| | | | Composition | Content (wt %) | Average fiber diameter (nm) | Content (wt %) |
|---|---|---|---|---|---|---|
| Example 1 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 2 | 10 | 0.5 |
| Example 2 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 2 | 50 | 0.5 |
| Example 3 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 2 | 100 | 0.5 |
| Example 4 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 2 | 5 | 0.5 |
| Example 5 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 2 | 1 | 0.5 |
| Example 6 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 1 | 10 | 0.5 |
| Example 7 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 5 | 10 | 0.5 |
| Example 8 | $LiNi_{0.8}Co_{0.1}Mn_{0.1}O_2$ | $Li_4Ti_5O_{12}$ | $Li_{1.2}Ca_{0.1}Zr_{1.9}(PO_4)_3$ | 10 | 10 | 1 |
| Example 9 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 2 | 10 | 1.5 |
| Example 10 | $LiNi_{0.8}Co_{0.1}Mn_{0.1}O_2$ | $Li_4Ti_5O_{12}$ | $Li_{1.3}Al_{0.3}Ti_{1.7}(PO_4)_3$ | 2 | 10 | 2.5 |
| Example 11 | $LiNi_{0.8}Co_{0.1}Mn_{0.1}O_2$ | $Li_4Ti_5O_{12}$ | $Li_{1.3}Al_{0.3}Ge_{1.7}(PO_4)_3$ | 2 | 10 | 1 |
| Example 12 | Olivine type $LiMn_{0.8}Fe_{0.2}PO_4$ | $Li_4Ti_5O_{12}$ | $Li_{1.3}Al_{0.3}Zr_{1.7}(PO_4)_3$ | 2 | 10 | 1 |
| Example 13 | $LiMn_2O_4$ | $Li_4Ti_5O_{12}$ | $Li_{1.3}Al_{0.3}Zr_{1.7}(PO_4)_3$ | 2 | 10 | 1 |
| Example 14 | $LiNi_{0.8}Co_{0.1}Mn_{0.1}O_2$ | $TiNb_2O_7$ | $Li_{1.3}Al_{0.3}Zr_{1.7}(PO_4)_3$ | 2 | 10 | 1 |
| Example 15 | $LiNi_{0.8}Co_{0.1}Mn_{0.1}O_2$ | $TiNb_2O_7$ | $Li_3PO_4$ | 3 | 10 | 1 |
| Example 16 | $LiNi_{0.8}Co_{0.1}Mn_{0.1}O_2$ | $TiNb_2O_7$ | $Al_2O_3$ | 3 | 10 | 1 |
| Example 17 | $LiNi_{0.8}Co_{0.1}Mn_{0.1}O_2$ | $TiNb_2O_7$ | $ZrO_2$ | 3 | 10 | 1 |
| Example 18 | $LiNi_{0.8}Co_{0.1}Mn_{0.1}O_2$ | $TiNb_2O_7$ | $TiO_2$ | 3 | 10 | 1 |
| Example 19 | $LiNi_{0.8}Co_{0.1}Mn_{0.1}O_2$ | $TiNb_2O_7$ | $AlPO_4$ | 3 | 10 | 1 |

TABLE 2

| | Positive electrode active material | Negative electrode active material | Inorganic solid particles in positive electrode | | Polymer fiber | |
| | | | Composition | Content (wt %) | Average fiber diameter (nm) | Content (wt %) |
|---|---|---|---|---|---|---|
| Example 20 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 2 | 10 | 0.2 |
| Example 21 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 2 | 10 | 5 |
| Example 22 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 0.5 | 10 | 0.5 |
| Example 23 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 2 | 10 | 0.5 |
| Example 24 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 2 | 10 | 0.5 |

TABLE 2-continued

| | Positive electrode active material | Negative electrode active material | Inorganic solid particles in positive electrode | | Polymer fiber | |
|---|---|---|---|---|---|---|
| | | | Composition | Content (wt %) | Average fiber diameter (nm) | Content (wt %) |
| Comparative Example 1 | $LiNi_{0.8}Co_{0.1}Mn_{0.1}O_2$ | $Li_4Ti_5O_{12}$ | — | — | — | 0 |
| Comparative Example 2 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 15 | — | 0 |
| Comparative Example 3 | $LiNi_{0.8}Co_{0.1}Mn_{0.1}O_2$ | $Li_4Ti_5O_{12}$ | $Al_2O_3$ | 1 | — | 0 |
| Comparative Example 4 | $LiNi_{0.8}Co_{0.1}Mn_{0.1}O_2$ | $Li_4Ti_5O_{12}$ | $Li_3PO_4$ | 1 | — | 0 |
| Comparative Example 5 | $LiNi_{0.8}Co_{0.1}Mn_{0.1}O_2$ | $Li_4Ti_5O_{12}$ | $Li_{1.3}Al_{0.3}Zr_{1.7}(PO_4)_3$ | 1 | — | 0 |
| Comparative Example 6 | $LiNi_{0.8}Co_{0.1}Mn_{0.1}O_2$ | $Li_4Ti_5O_{12}$ | — | — | 10 | 5 |
| Comparative Example 7 | $LiNi_{0.8}Co_{0.1}Mn_{0.1}O_2$ | $Li_4Ti_5O_{12}$ | — | — | 10 | 0.05 |
| Comparative Example 8 | $LiNi_{0.8}Co_{0.1}Mn_{0.1}O_2$ | $Li_4Ti_5O_{12}$ | — | — | 500 | 1 |

TABLE 3

Composition of positive electrode active material-containing layer

| | Positive electrode active material particles (wt %) | Inorganic solid particles (wt %) | Polymer fiber (wt %) | Conductive agent (wt %) | Binder (wt %) |
|---|---|---|---|---|---|
| Example 1 | 89.5 | 2 | 0.5 | 5 | 3 |
| Example 2 | 89.5 | 2 | 0.5 | 5 | 3 |
| Example 3 | 89.5 | 2 | 0.5 | 5 | 3 |
| Example 4 | 89.5 | 2 | 0.5 | 5 | 3 |
| Example 5 | 89.5 | 2 | 0.5 | 5 | 3 |
| Example 6 | 89.5 | 1 | 0.5 | 6 | 3 |
| Example 7 | 88.5 | 5 | 0.5 | 4 | 2 |
| Example 8 | 83.0 | 10 | 1 | 4 | 2 |
| Example 9 | 89.5 | 2 | 1.5 | 5 | 2 |
| Example 10 | 89.5 | 2 | 2.5 | 4 | 2 |
| Example 11 | 89.5 | 2 | 1 | 5 | 2.5 |
| Example 12 | 89.5 | 2 | 1 | 5 | 2.5 |
| Example 13 | 89.5 | 2 | 1 | 5 | 2.5 |
| Example 14 | 89.5 | 2 | 1 | 5 | 2.5 |
| Example 15 | 89.5 | 3 | 1 | 4 | 2.5 |
| Example 16 | 89.5 | 3 | 1 | 4 | 2.5 |
| Example 17 | 89.5 | 3 | 1 | 4 | 2.5 |
| Example 18 | 89.5 | 3 | 1 | 4 | 2.5 |
| Example 19 | 89.5 | 3 | 1 | 4 | 2.5 |

TABLE 4

Composition of positive electrode active material-containing layer

| | Positive electrode active material particles (wt %) | Inorganic solid particles (wt %) | Polymer fiber (wt %) | Conductive agent (wt %) | Binder (wt %) |
|---|---|---|---|---|---|
| Example 20 | 89.5 | 2 | 0.2 | 5 | 3.3 |
| Example 21 | 89.5 | 2 | 5 | 2.5 | 1.0 |
| Example 22 | 89.5 | 0.5 | 0.5 | 6.5 | 3 |
| Example 23 | 89.5 | 2 | 0.5 | 5 | 3 |
| Example 24 | 89.5 | 2 | 0.5 | 5 | 3 |
| Comparative Example 1 | 89.5 | — | 0 | 5 | 5.5 |
| Comparative Example 2 | 80 | 15 | 0 | 2 | 3 |
| Comparative Example 3 | 89.5 | 1 | 0 | 4.0 | 5.5 |
| Comparative Example 4 | 89.5 | 1 | 0 | 4.0 | 5.5 |
| Comparative Example 5 | 89.5 | 1 | 0 | 4.0 | 5.5 |
| Comparative Example 6 | 89.5 | — | 5 | 4.5 | 1.0 |
| Comparative Example 7 | 89.5 | — | 0.05 | 7.4 | 3.05 |
| Comparative Example 8 | 89.5 | — | 1 | 4.0 | 5.5 |

TABLE 5

| | Discharge capacity (Ah) at 25° C. | Capacity retention ratio (%) in 5,000th cycle | Capacity retention ratio (%) of 10 C discharge | Capacity retention ratio (%) of discharge at −30° C. |
|---|---|---|---|---|
| Example 1 | 6.0 | 95 | 90 | 75 |
| Example 2 | 6.0 | 94 | 80 | 70 |
| Example 3 | 6.0 | 90 | 75 | 65 |
| Example 4 | 6.0 | 95 | 90 | 75 |
| Example 5 | 6.0 | 94 | 85 | 75 |
| Example 6 | 5.9 | 95 | 92 | 78 |
| Example 7 | 5.8 | 95 | 93 | 78 |
| Example 8 | 5.9 | 95 | 90 | 78 |
| Example 9 | 5.8 | 95 | 90 | 78 |
| Example 10 | 5.7 | 92 | 85 | 75 |
| Example 11 | 6.0 | 93 | 88 | 75 |
| Example 12 | 6.0 | 93 | 85 | 75 |
| Example 13 | 5.0 | 93 | 94 | 80 |
| Example 14 | 7.0 | 90 | 85 | 75 |
| Example 15 | 7.0 | 88 | 80 | 73 |
| Example 16 | 6.8 | 87 | 78 | 70 |
| Example 17 | 6.8 | 86 | 76 | 70 |
| Example 18 | 6.8 | 86 | 77 | 70 |
| Example 19 | 6.9 | 87 | 78 | 73 |

TABLE 6

|  | Discharge capacity (Ah) at 25° C. | Capacity retention ratio (%) in 5,000th cycle | Capacity retention ratio (%) of 10 C discharge | Capacity retention ratio (%) of discharge at −30° C. |
|---|---|---|---|---|
| Example 20 | 6.0 | 93 | 90 | 72 |
| Example 21 | 6.0 | 96 | 90 | 78 |
| Example 22 | 6.0 | 90 | 85 | 73 |
| Example 23 | 6.0 | 95 | 90 | 75 |
| Example 24 | 6.0 | 92 | 85 | 65 |
| Comparative Example 1 | 5.9 | 88 | 60 | 60 |
| Comparative Example 2 | 5.5 | 80 | 52 | 52 |
| Comparative Example 3 | 5.8 | 88 | 60 | 60 |
| Comparative Example 4 | 5.8 | 89 | 60 | 60 |
| Comparative Example 5 | 5.8 | 85 | 62 | 62 |
| Comparative Example 6 | 5.5 | 85 | 50 | 58 |
| Comparative Example 7 | 5.9 | 88 | 60 | 60 |
| Comparative Example 8 | 5.8 | 86 | 60 | 58 |

As is apparent from Table 2, Examples 1 to 15 of the secondary batteries are more excellent in balance among the cycle life performance, discharge rate performance, and low-temperature discharge performance, as compared to Comparative Examples 1 to 8. As can be seen from comparison between Examples 1 and 23, Example 23 including the liquid electrolyte instead of the gel electrolyte can obtain cycle life performance, discharge rate performance, and low-temperature discharge performance that are equivalent to those in Example 1. Furthermore, as can be seen from comparison between Examples 1 and 24, Example 1 including the composite electrolyte layer is more excellent in cycle life performance, discharge rate performance, and low-temperature discharge performance, as compared to Example 24 including the separator instead of the composite electrolyte layer.

The positive electrode according to at least one of the embodiments or examples contains polymer fibers having an average fiber diameter of 1 nm to 100 nm and inorganic solid particles, thereby making it possible to decrease the ion conduction resistance in the positive electrode. Therefore, the secondary battery including this positive electrode can improve the charge-and-discharge cycle life, discharge rate performance, and low-temperature performance.

Example 30

92 wt % of secondary particles of $LiNi_{0.8}Co_{0.1}Mn_{0.1}O_2$ having an average secondary particle size of 5 μm serving as a positive electrode active material, 5 wt % of graphite powder serving as a conductive agent, and 3 wt % of PVdF serving as a binder were dispersed in an n-methylpyrolidone (NMP) solvent to prepare a slurry. The obtained slurry was applied to both surfaces of a 15 μm thick aluminum alloy foil (purity of 99%), dried, and pressed, thereby producing a positive electrode having an electrode density of 3.1 g/cm³.

88 wt % of secondary particles of $TiNb_2O_7$ having an average secondary particle size of 10 μm and a specific surface area of 5 m²/g serving as a negative electrode active material, 3 wt % of particles of $Li_{1.3}Al_{0.3}Zr_{1.7}(PO_4)_3$ having an average primary particle size of 0.4 μm, 5 wt % of graphite powder having an average particle size of 6 μm serving as a conductive agent, 2 wt % of cellulose nanofibers having an average fiber diameter of 50 nm, and 2 wt % of carboxymethyl cellulose (CMC) serving as a binder were mixed and dispersed in water, and the mixture was stirred using a ball mill at a rotational speed of 1,000 rpm for a stirring time of 2 hours to prepare a slurry. The obtained slurry was applied to both surfaces of a 15 μm thick aluminum alloy foil (purity of 99.3%), dried, and heat pressed, thereby producing a negative electrode having a density of 2.7 g/cm³ of a negative electrode active material containing layer. The porosity of the negative electrode except for the current collector was 40%.

As an electrolyte, a composite electrolyte was used. An aqueous solution obtained by dispersing particles of $Li_{1.3}Al_{0.3}Zr_{1.7}(PO_4)_3$ having an average particle size (diameter) of 1 μm and cellulose nanofiber having an average fiber diameter of 10 nm was applied to surfaces (principal surfaces) of both of the positive electrode active material containing layer and the negative electrode active material containing layer, and dried, thereby forming an electrolyte precursor layer.

An electrode group was obtained by stacking the positive electrode and the negative electrode so that the electrolyte precursor layer was interposed between the positive electrode and the negative electrode. The obtained electrode group was stored in a thin metal can container having a thickness of 0.25 mm and made of an aluminum alloy (Al purity of 99%). Next, a liquid nonaqueous electrolyte obtained by dissolving $LiPF_6$ at a concentration of 1 M in a nonaqueous solvent obtained by mixing propylene carbonate (PC) and diethyl carbonate (DEC) at a volume ratio of PC:DEC=1:2, and 2 wt % of a polymer containing polyacrylonitrile were injected into the metal can container, and the injected mixture permeated the pores of the positive and negative electrodes. After that, the electrolyte precursor layer was allowed to gel by heating to 60° C., and a gel electrolyte layer having a thickness of 15 μm was formed between the positive electrode and the negative electrode. In the composition of the obtained gel electrolyte layer, the weight ratio of the inorganic solid particles, the gel electrolyte containing a nonaqueous electrolyte and a polymer of polyacrylonitrile, and the cellulose nanofiber was 94:4:2.

By performing the above steps, a rectangular nonaqueous electrolyte secondary battery having the above described structure shown in FIG. 1 and having a thickness of 13 mm, a width of 62 mm, and a height of 96 mm was prepared.

Examples 31 to 40 and Comparative Examples 11 to 16

A secondary battery was produced in accordance with a procedure similar to that described in Example 30 except that the composition of a positive electrode active material, the composition of a negative electrode active material, the composition of inorganic solid particles, the content of inorganic solid particles in the negative electrode active material containing layer, the average fiber diameter of polymer fibers, the content of polymer fibers in the negative electrode active material containing layer, and the content of each of a negative electrode active material, a conductive agent, and a binder in the negative electrode active material containing layer were respectively set as shown in the following Tables 7 to 9.

In this regard, the average secondary particle size of the titanium dioxide ($TiO_2(B)$) having a monoclinic crystal structure as the negative electrode active material of Example 39 was 15 μm and the specific surface area was 20 m²/g. Further, as the negative electrode active material of Example 40, particles of $Li_4Ti_5O_{12}$ having an average primary particle size of 0.6 μm and a specific surface area of 10 m²/g were used.

Example 41

A secondary battery was produced in accordance with a procedure similar to that described in Example 1 in a combination of the positive electrode of Example 1 and the negative electrode of Example 30.

Example 42

An electrode group was produced in accordance with a procedure similar to that described in Example 30, and the produced electrode group was stored in a thin metal can similar to that described in Example 1.

A liquid nonaqueous electrolyte having a composition similar to that described in Example 30 was injected into the metal can, and permeated the pores of the positive and negative electrodes. After that, the metal can was sealed, thereby obtaining a rectangular nonaqueous electrolyte secondary battery having the structure shown in FIG. 1 and a size similar to that described in Example 30.

Example 43

Instead of the electrolyte containing layer precursor, a separator made of a cellulose fiber nonwoven fabric having a thickness of 20 μm was used. An electrode group was produced by stacking a positive electrode and a negative electrode so that the separator interposed between a positive electrode active material containing layer and a negative electrode active material containing layer, and spirally winding the stacked structure in a flat shape, and the produced electrode group was stored in a thin metal can similar to that described in Example 30.

A liquid nonaqueous electrolyte having a composition similar to that described in Example 30 was injected into the metal can, and permeated the pores of the positive and negative electrodes. After that, the metal can was sealed, thereby obtaining a rectangular nonaqueous electrolyte secondary battery having the structure shown in FIG. 1 and a size similar to that described in Example 30.

The obtained secondary batteries was charged up to 2.9 V at 25° C. with a constant current of 12 A, and then charged with a constant voltage of 2.9 V, and when the current value reached 0.05 A, the charging was ended, subsequently, the discharge capacity at the time of discharging to 1.5 V with 6 A was measured. A capacity retention ratio was measured after repeating this charge and discharge cycle 5,000 times.

As the large current discharge performance, a capacity retention ratio at the time of 5 C (30 A) discharge was measured (by defining a capacity at the time of 1.2 A discharge as 100%). Subsequently, the capacity retention ratio at the time of discharging with 1.2 A at −30° C. to 25° C. was measured.

These measurement results are shown in Table 10 below. Note that the results of Comparative Example 1 were also shown in Table 10.

TABLE 7

| | Positive electrode active material | Negative electrode active material | Inorganic solid particles in negative electrode | Content of inorganic solid particles (wt %) | Average fiber diameter of polymer fibers in negative electrode (nm) | Content of polymer fibers (wt %) |
|---|---|---|---|---|---|---|
| Example 30 | $LiNi_{0.8}Co_{0.1}Mn_{0.1}O_2$ | $TiNb_2O_7$ | $Li_{1.3}Al_{0.3}Zr_{1.7}(PO_4)_3$ | 3 | 50 | 2 |
| Example 31 | $LiNi_{0.8}Co_{0.1}Mn_{0.1}O_2$ | $TiNb_2O_7$ | $Li_{1.3}Al_{0.3}Zr_{1.7}(PO_4)_3$ | 3 | 60 | 3 |
| Example 32 | $LiNi_{0.8}Co_{0.1}Mn_{0.1}O_2$ | $TiNb_2O_7$ | $Li_{1.3}Al_{0.3}Zr_{1.7}(PO_4)_3$ | 3 | 100 | 10 |
| Example 33 | $LiNi_{0.8}Co_{0.1}Mn_{0.1}O_2$ | $TiNb_2O_7$ | $Li_{1.3}Al_{0.3}Zr_{1.7}(PO_4)_3$ | 3 | 5 | 2 |
| Example 34 | $LiNi_{0.8}Co_{0.1}Mn_{0.1}O_2$ | $TiNb_2O_7$ | $Li_{1.3}Al_{0.3}Zr_{1.7}(PO_4)_3$ | 3 | 1 | 2 |
| Example 35 | $LiNi_{0.8}Co_{0.1}Mn_{0.1}O_2$ | $TiNb_2O_7$ | $Li_{1.3}Al_{0.3}Zr_{1.7}(PO_4)_3$ | 1 | 20 | 2 |
| Example 36 | $LiNi_{0.8}Co_{0.1}Mn_{0.1}O_2$ | $TiNb_2O_7$ | $Li_{1.3}Al_{0.3}Zr_{1.7}(PO_4)_3$ | 5 | 80 | 5 |
| Example 37 | $LiNi_{0.8}Co_{0.1}Mn_{0.1}O_2$ | $TiNb_2O_7$ | $Li_{1.3}Al_{0.3}Zr_{1.7}(PO_4)_3$ | 10 | 10 | 1 |
| Example 38 | $LiNi_{0.8}Co_{0.1}Mn_{0.1}O_2$ | $TiNb_2O_7$ | $Li_{1.2}Ca_{0.1}Zr_{1.9}(PO_4)_3$ | 2 | 10 | 2 |
| Example 39 | $LiNi_{0.8}Co_{0.1}Mn_{0.1}O_2$ | $TiO_2(B)$ | $Li_{1.3}Al_{0.3}Zr_{1.7}(PO_4)_3$ | 3 | 50 | 2 |
| Example 40 | $LiNi_{0.8}Co_{0.1}Mn_{0.1}O_2$ | $Li_4Ti_5O_{12}$ | $Li_{1.3}Al_{0.3}Ti_{1.7}(PO_4)_3$ | 3 | 50 | 2 |

TABLE 8

| | Positive electrode active material | Negative electrode active material | Inorganic solid particles in negative electrode | Content of inorganic solid particles (wt %) | Average fiber diameter of polymer fibers in negative electrode (nm) | Content of polymer fibers (wt %) |
|---|---|---|---|---|---|---|
| Comparative Example 11 | $LiNi_{0.8}Co_{0.1}Mn_{0.1}O_2$ | $TiNb_2O_7$ | $Li_{1.3}Al_{0.3}Zr_{1.7}(PO_4)_3$ | 0.3 | — | — |
| Comparative Example 12 | $LiNi_{0.8}Co_{0.1}Mn_{0.1}O_2$ | $TiNb_2O_7$ | $Al_2O_3$ | 0.4 | — | — |
| Comparative Example 13 | $LiNi_{0.8}Co_{0.1}Mn_{0.1}O_2$ | $TiNb_2O_7$ | $Li_3PO_4$ | 0.3 | — | — |
| Comparative Example 14 | $LiNi_{0.8}Co_{0.1}Mn_{0.1}O_2$ | $TiNb_2O_7$ | — | — | 10 | 5 |

TABLE 8-continued

|  | Positive electrode active material | Negative electrode active material | Inorganic solid particles in negative electrode | Content of inorganic solid particles (wt %) | Average fiber diameter of polymer fibers in negative electrode (nm) | Content of polymer fibers (wt %) |
|---|---|---|---|---|---|---|
| Comparative Example 15 | $LiNi_{0.8}Co_{0.1}Mn_{0.1}O_2$ | $TiNb_2O_7$ | — | — | 10 | 0.05 |
| Comparative Example 16 | $LiNi_{0.8}Co_{0.1}Mn_{0.1}O_2$ | $TiNb_2O_7$ | — | — | 500 | 1 |

TABLE 9

|  | Negative electrode active material particles (wt %) | Inorganic solid particles (wt %) | Polymer fibers (wt %) | Conductive agent (wt %) | Binder (wt %) |
|---|---|---|---|---|---|
| Example 30 | 88 | 3 | 2 | 5 | 2 |
| Example 31 | 88 | 3 | 3 | 5 | 1 |
| Example 32 | 80 | 3 | 10 | 6.5 | 0.5 |
| Example 33 | 87 | 3 | 2 | 7 | 1 |
| Example 34 | 90 | 3 | 2 | 4 | 1 |
| Example 35 | 95 | 1 | 2 | 1 | 1 |
| Example 36 | 84 | 5 | 5 | 5.5 | 1 |
| Example 37 | 84 | 10 | 1 | 2 | 3 |
| Example 38 | 90 | 2 | 2 | 5 | 1 |
| Example 39 | 87 | 3 | 2 | 6 | 2 |
| Example 40 | 86 | 3 | 2 | 8 | 1 |
| Comparative Example 11 | 88 | 0.3 | 0 | 5 | 6.7 |
| Comparative Example 12 | 88 | 0.4 | 0 | 5 | 6.6 |
| Comparative Example 13 | 85 | 0.3 | 0 | 5 | 9.7 |
| Comparative Example 14 | 89.5 | 0 | 5 | 5 | 0.5 |
| Comparative Example 15 | 89.95 | 0 | 0.05 | 5 | 5 |
| Comparative Example 16 | 88 | 0 | 1 | 5 | 6 |

TABLE 10

|  | Discharge capacity at 25° C. (Ah) | Capacity retention ratio in the 5,000th cycle (%) | Discharge capacity retention ratio at the time of 10 C (%) | Discharge capacity retention ratio at −30° C. (%) |
|---|---|---|---|---|
| Example 30 | 7 | 95 | 90 | 85 |
| Example 31 | 7 | 94 | 90 | 85 |
| Example 32 | 6.7 | 90 | 80 | 75 |
| Example 33 | 7 | 95 | 92 | 86 |
| Example 34 | 7 | 94 | 88 | 75 |
| Example 35 | 7.2 | 80 | 70 | 70 |
| Example 36 | 7 | 95 | 90 | 90 |
| Example 37 | 7 | 95 | 90 | 85 |
| Example 38 | 6.2 | 80 | 80 | 80 |
| Example 39 | 6 | 95 | 90 | 90 |
| Example 40 | 7 | 95 | 93 | 90 |
| Example 41 | 7 | 95 | 93 | 90 |
| Example 42 | 7.1 | 95 | 95 | 93 |
| Example 43 | 7 | 90 | 80 | 70 |
| Comparative Example 1 | 5.9 | 88 | 60 | 60 |
| Comparative Example 11 | 6.9 | 70 | 60 | 40 |
| Comparative Example 12 | 6.8 | 60 | 50 | 20 |
| Comparative Example 13 | 6.9 | 65 | 55 | 30 |
| Comparative Example 14 | 6.9 | 70 | 50 | 20 |
| Comparative Example 15 | 6.9 | 65 | 30 | 20 |
| Comparative Example 16 | 6.9 | 60 | 20 | 20 |

As is apparent from Tables 7 to 10, Examples 30 to 43 of the secondary batteries are more excellent in balance among the cycle life performance, the discharge rate performance, and the low temperature discharge performance, as compared to Comparative Examples 11 to 16. From the results of Comparative Examples 11 to 16, in the case where only one of the inorganic solid particles and the polymer fibers is contained in the negative electrode, it can be understood that the secondary batteries of Comparative Examples 11 to 16 are inferior in all of the cycle life performance, the discharge rate performance, and the low temperature discharge performance.

From the comparison between Examples 30 and 42, it can be understood that the secondary battery of Example 42 including a liquid electrolyte instead of the gel electrolyte has the cycle life performance that is equivalent to that of Example 30, and has the discharge rate performance and the low temperature discharge performance that are more excellent than those of Example 30. Further, from the comparison between Examples 30 and 43, it can be understood that the secondary battery of Example 30 including a composite electrolyte layer is more excellent in the cycle life performance, the discharge rate performance, and the low temperature discharge performance, as compared to those of Example 43 including a separator instead of the composite electrolyte layer. Furthermore, from the results of Example 41, it can be understood that when both of the positive electrode and the negative electrode contain polymer fibers having an average fiber diameter of ranging from 1 nm to 100 nm and inorganic solid particles, all of the cycle life performance, the discharge rate performance, and the low temperature discharge performance are favorable.

The electrode according to at least one of the embodiments or examples contains polymer fibers having an average fiber diameter of ranging from 1 nm to 100 nm and inorganic solid particles, thereby making it possible to decrease the ion conduction resistance in the electrode. Therefore, a secondary battery including the electrode can improve the charge and discharge cycle life, the discharge rate performance, and the low temperature performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The inventions described in the scope of the original claims is noted below:

What is claimed is:

1. A secondary battery, comprising:
    a liquid electrolyte;
    a positive electrode; and
    a negative electrode comprising an active material containing layer that contains
        active material particles capable of insertion and extraction of lithium ions, the active material particles comprising a niobium titanium oxide,
        polymer fibers having an average fiber diameter of 1 nm to 100 nm, and
        lithium-containing inorganic solid particles having lithium ion conductivity,
    wherein the lithium-containing inorganic solid particles include a phosphate compound,
    wherein the phosphate compound has a NASICON structure and is expressed as $Li_{1+y}Al_xM_{2-x}(PO_4)_3$, wherein
    M represents at least one element selected from the group consisting of Ti, Ge, Sr, Sn, Zr, and Ca,
    x is not less than 0 and not more than 1, and
    y is not less than 0 and not more than 1,
    wherein a content of the polymer fibers in the active material containing layer ranges from 0.2 wt. % to 5 wt. %, and
    wherein a content of the inorganic solid particles in the active material containing layer ranges from 0.5 wt. % to 10 wt. %,
    wherein the polymer fibers are dispersed to form fine through holes in a mesh shape,
    wherein the liquid electrolyte is held by the mesh shape of the polymer fibers in the active material containing layer.

2. The secondary battery of claim 1, wherein the polymer fibers include cellulose fibers.

3. The secondary battery of claim 1, wherein the negative electrode further includes at least one material selected from the group consisting of a lithium titanium oxide having a spinel structure, and a monoclinic titanium oxide.

4. A battery pack comprising
    at least one of the secondary battery of claim 1.

5. The battery pack of claim 4, further comprising:
    an external power distribution terminal; and
    a protective circuit.

6. The battery pack of claim 4, which comprises a plurality of the secondary batteries, and the secondary batteries are electrically connected in series, in parallel, or in a combination of series connection and parallel connection.

7. A vehicle, comprising:
    the battery pack of claim 4.

8. The secondary battery of claim 1, wherein the active material-containing layer comprises a conductive agent including at least one material selected from the group consisting of a carbon nanotube and a carbon nanofiber.

9. The secondary battery of claim 1, wherein M in the phosphate compound is Ti.

10. The secondary battery of claim 1, wherein M in the phosphate compound is Ge.

11. The secondary battery of claim 1, wherein M in the phosphate compound is Sr.

12. The secondary battery of claim 1, wherein M in the phosphate compound is Sn.

13. The secondary battery of claim 1, wherein M in the phosphate compound is Zr.

14. The secondary battery of claim 1, wherein M in the phosphate compound is Ca.

15. The secondary battery of claim 1, wherein the lithium-containing inorganic solid particles consist of the phosphate compound.

* * * * *